(12) United States Patent
Migos et al.

(10) Patent No.: US 8,448,083 B1
(45) Date of Patent: May 21, 2013

(54) GESTURE CONTROL OF MULTIMEDIA EDITING APPLICATIONS

(75) Inventors: Charles Migos, San Francisco, CA (US); Giulia M. Pagallo, Cupertino, CA (US); Jean-Pierre Mouileseaux, Venice, CA (US); Larry S. Yaeger, Morgantown, IN (US)

(73) Assignee: Apple Inc., Cupertino, CA (US)

( * ) Notice: Subject to any disclaimer, the term of this patent is extended or adjusted under 35 U.S.C. 154(b) by 1551 days.

(21) Appl. No.: 10/826,878

(22) Filed: Apr. 16, 2004

(51) Int. Cl.
*G06F 3/048* (2006.01)

(52) U.S. Cl.
USPC ............ 715/781; 715/800; 715/863; 345/671

(58) Field of Classification Search
USPC .. 715/716, 719, 723, 863, 781, 800; 345/173, 345/179, 156–158, 671; 382/186, 187, 202, 382/203
See application file for complete search history.

(56) References Cited

U.S. PATENT DOCUMENTS

| | | | |
|---|---|---|---|
| 5,252,951 A * | 10/1993 | Tannenbaum et al. | 345/156 |
| 5,339,393 A * | 8/1994 | Duffy et al. | 715/723 |
| 5,398,310 A | 3/1995 | Tchao et al. | |
| 5,463,696 A | 10/1995 | Beernink et al. | |
| 5,502,803 A * | 3/1996 | Yoshida et al. | 715/201 |
| 5,523,775 A | 6/1996 | Capps | |
| 5,528,743 A | 6/1996 | Tou et al. | |
| 5,555,363 A | 9/1996 | Tou et al. | |
| 5,563,996 A | 10/1996 | Tchao | |
| 5,581,681 A | 12/1996 | Tchao et al. | |
| 5,583,542 A | 12/1996 | Capps et al. | |
| 5,583,946 A | 12/1996 | Gourdol | |
| 5,588,098 A | 12/1996 | Chen et al. | |
| 5,590,219 A | 12/1996 | Gourdol | |
| 5,594,640 A | 1/1997 | Capps et al. | |
| 5,594,810 A | 1/1997 | Gourdol | |
| 5,596,346 A * | 1/1997 | Leone et al. | 345/667 |
| 5,612,719 A | 3/1997 | Beernink et al. | |
| 5,615,384 A * | 3/1997 | Allard et al. | 715/800 |
| 5,657,047 A * | 8/1997 | Tarolli | 345/671 |
| 5,677,710 A | 10/1997 | Thompson-Rohrlich | |
| 5,717,848 A | 2/1998 | Watanabe et al. | |
| 5,731,819 A | 3/1998 | Gagne et al. | |
| 5,821,930 A * | 10/1998 | Hansen | 715/702 |
| 5,835,692 A | 11/1998 | Cragun et al. | |

(Continued)

FOREIGN PATENT DOCUMENTS

DE 101 40 874 A1 3/2008
WO WO 01/67222 A2 9/2001

OTHER PUBLICATIONS

"Windows XP Tablet PC Edition, Developer's Documentation", Microsoft Corp., 2004, 47 pages, retrieved from msdn.microsoft.com on May 26, 2004.

*Primary Examiner* — Phenuel Salomon
(74) *Attorney, Agent, or Firm* — Morgan, Lewis & Bockius LLP

(57) ABSTRACT

A multimedia editing application includes a plurality of gestures that are used to control transport and playback, timing, editing, view management, and other functions of the application. The gestures have shapes or characteristics that are visually mnemonic of their associated functions or the objects on which the functions operate, but which themselves are not linguistic forms such as letters or numbers which are derived from the names of the associated functions. The visual mnemonics may connote the motion or shape of a part of the human body.

12 Claims, 25 Drawing Sheets

U.S. PATENT DOCUMENTS

| | | | |
|---|---|---|---|
| 5,835,693 A | 11/1998 | Lynch et al. | |
| 5,883,619 A * | 3/1999 | Ho et al. | 345/163 |
| 5,883,639 A | 3/1999 | Walton et al. | |
| 5,892,507 A * | 4/1999 | Moorby et al. | 715/205 |
| 6,011,562 A | 1/2000 | Gagne et al. | |
| 6,045,446 A | 4/2000 | Ohshima | |
| 6,154,601 A | 11/2000 | Yaegashi et al. | |
| 6,266,053 B1 | 7/2001 | French et al. | |
| 6,310,621 B1 | 10/2001 | Gagne et al. | |
| 6,353,437 B1 | 3/2002 | Gagne | |
| 6,414,686 B1 * | 7/2002 | Protheroe et al. | 345/474 |
| 6,476,834 B1 * | 11/2002 | Doval et al. | 715/863 |
| 6,525,736 B1 | 2/2003 | Erikawa et al. | |
| 6,664,986 B1 | 12/2003 | Kopelman et al. | |
| 6,714,201 B1 | 3/2004 | Grinstein et al. | |
| 6,756,984 B1 | 6/2004 | Miyagawa | |
| 7,000,200 B1 * | 2/2006 | Martins | 715/863 |
| 7,004,394 B2 * | 2/2006 | Kim | 235/472.01 |
| 7,158,123 B2 * | 1/2007 | Myers et al. | 345/173 |
| 7,240,289 B2 * | 7/2007 | Naughton et al. | 715/740 |
| 7,614,008 B2 | 11/2009 | Ording | |
| 2001/0030647 A1 | 10/2001 | Sowizral et al. | |
| 2002/0112180 A1 | 8/2002 | Land et al. | |
| 2002/0140633 A1 * | 10/2002 | Rafii et al. | 345/8 |
| 2003/0156145 A1 * | 8/2003 | Hullender et al. | 345/863 |
| 2004/0036711 A1 | 2/2004 | Anderson | |
| 2004/0039934 A1 | 2/2004 | Land et al. | |
| 2004/0119699 A1 * | 6/2004 | Jones et al. | 345/173 |
| 2004/0141010 A1 | 7/2004 | Fitzmaurice et al. | 345/810 |
| 2004/0196267 A1 * | 10/2004 | Kawai et al. | 345/173 |
| 2004/0212617 A1 * | 10/2004 | Fitzmaurice et al. | 345/440 |
| 2005/0046615 A1 * | 3/2005 | Han | 342/357.06 |
| 2005/0057524 A1 * | 3/2005 | Hill et al. | 345/173 |

* cited by examiner

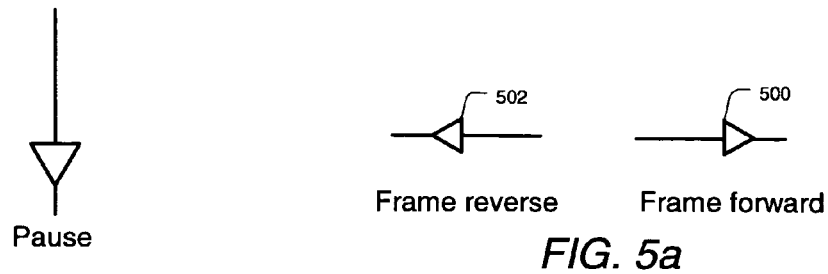
FIG. 4 Pause
FIG. 5a Frame reverse / Frame forward
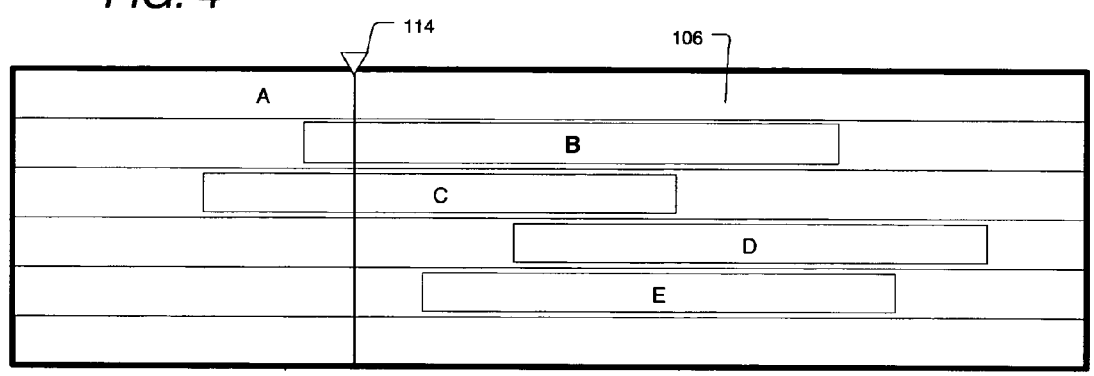
FIG. 5b
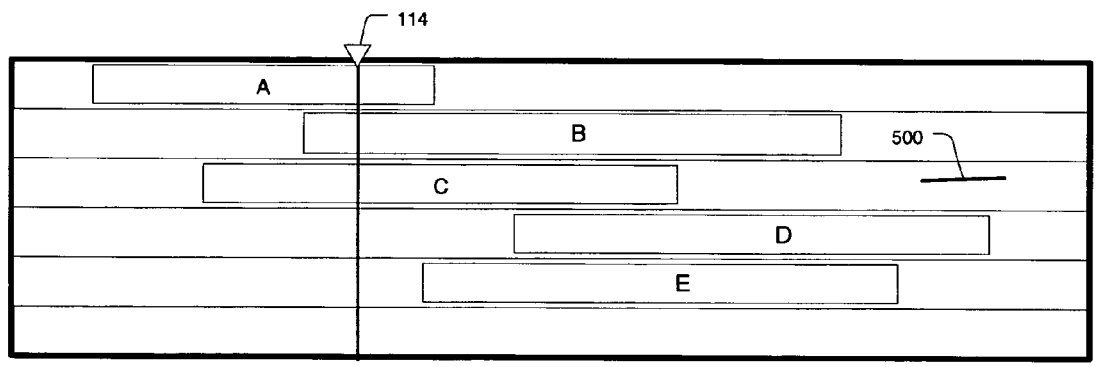
FIG. 5c
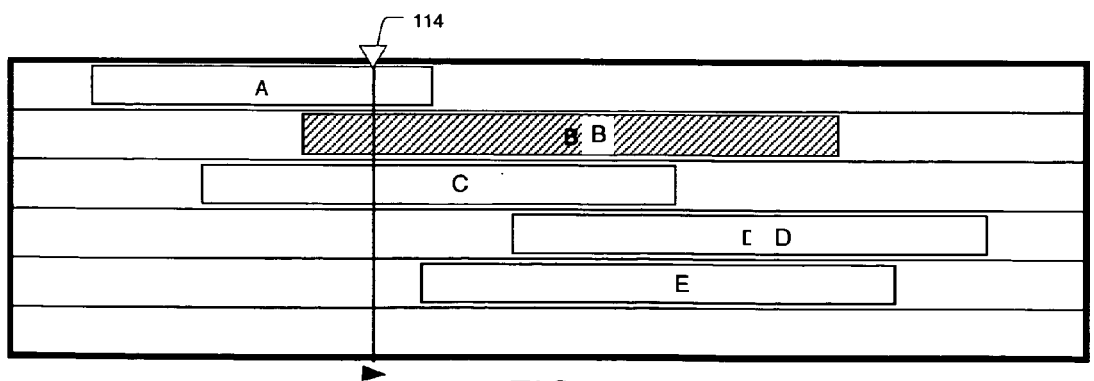
FIG. 5d

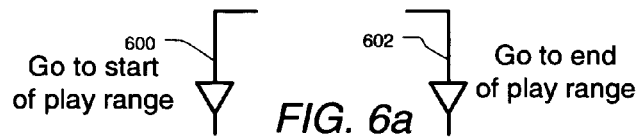
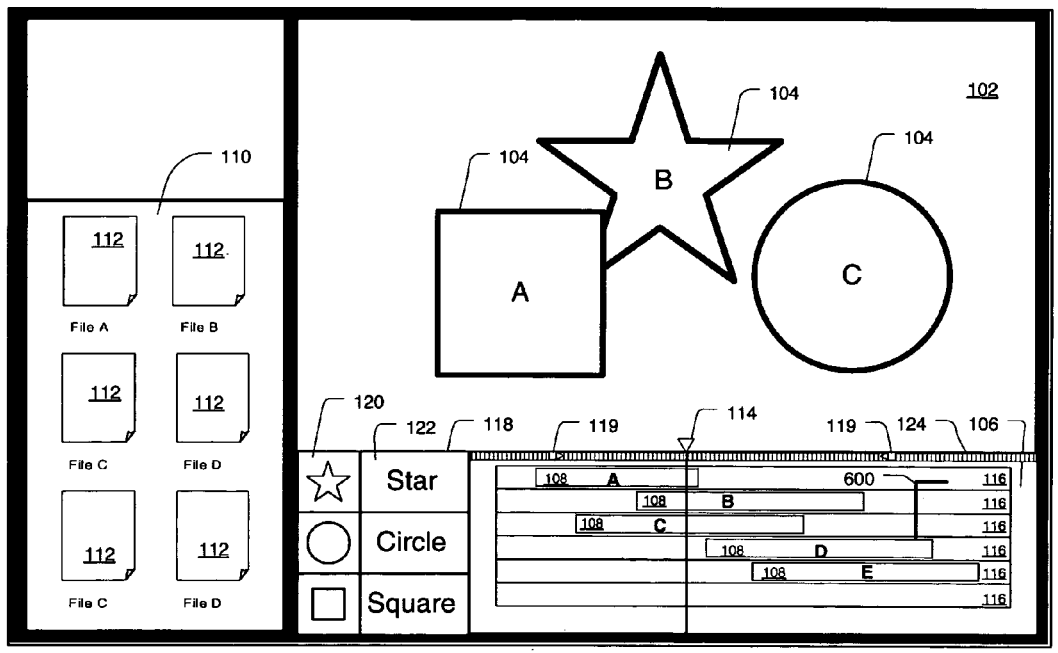
FIG. 6b
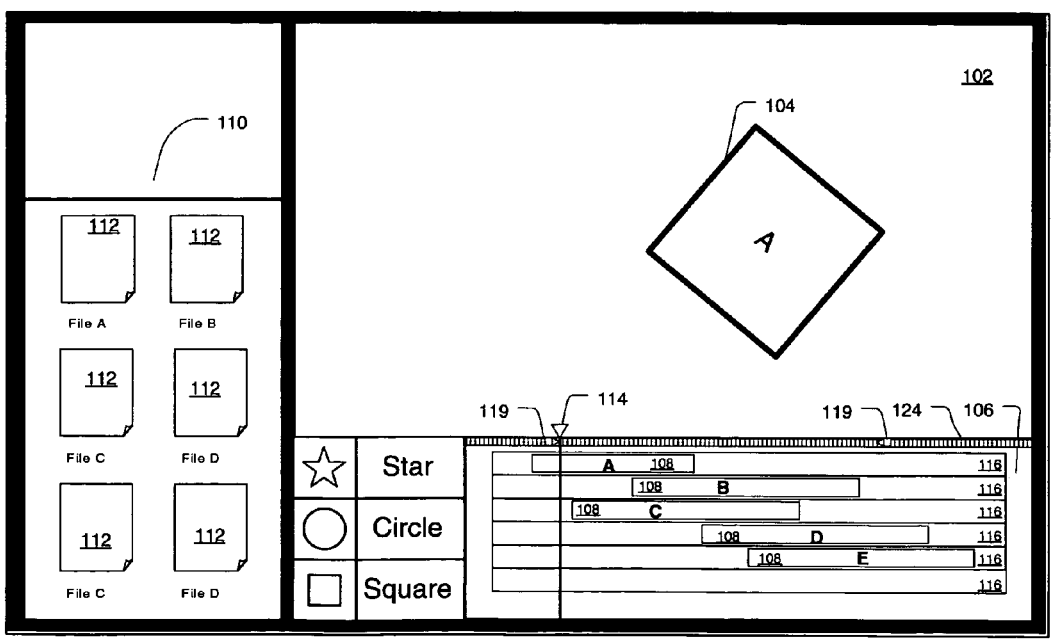
FIG. 6c

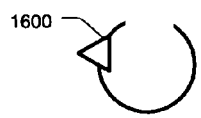 
FIG. 16a
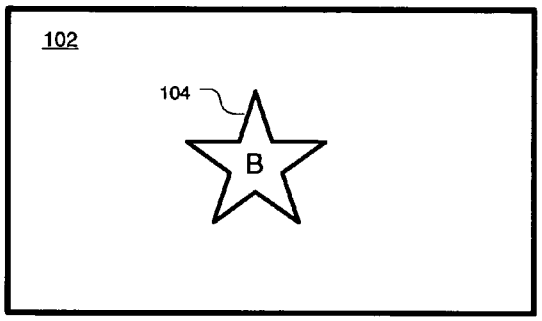 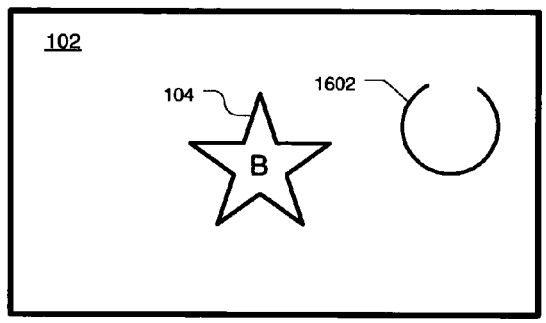
FIG. 16b          FIG. 16e
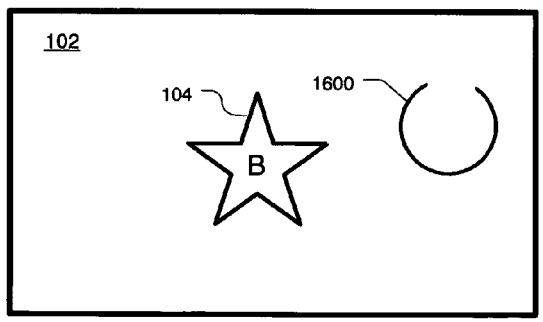 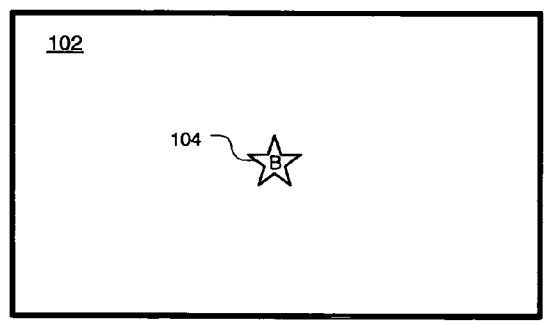
FIG. 16c          FIG. 16f
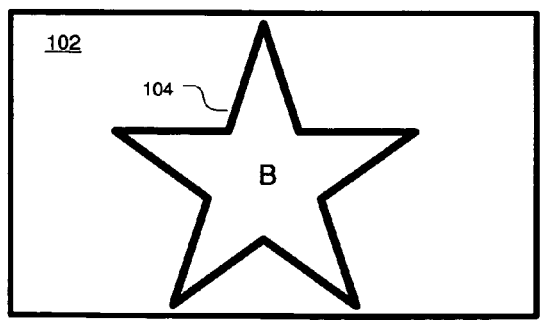
FIG. 16d Interactive zoom mode Pan mode Home view Fit to window

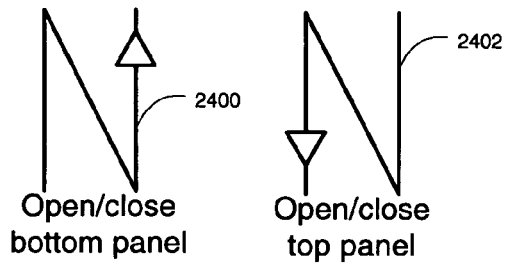
Open/close bottom panel    Open/close top panel    Open/close left panel    Open/close right panel
*FIG. 24a*      *FIG. 25a*
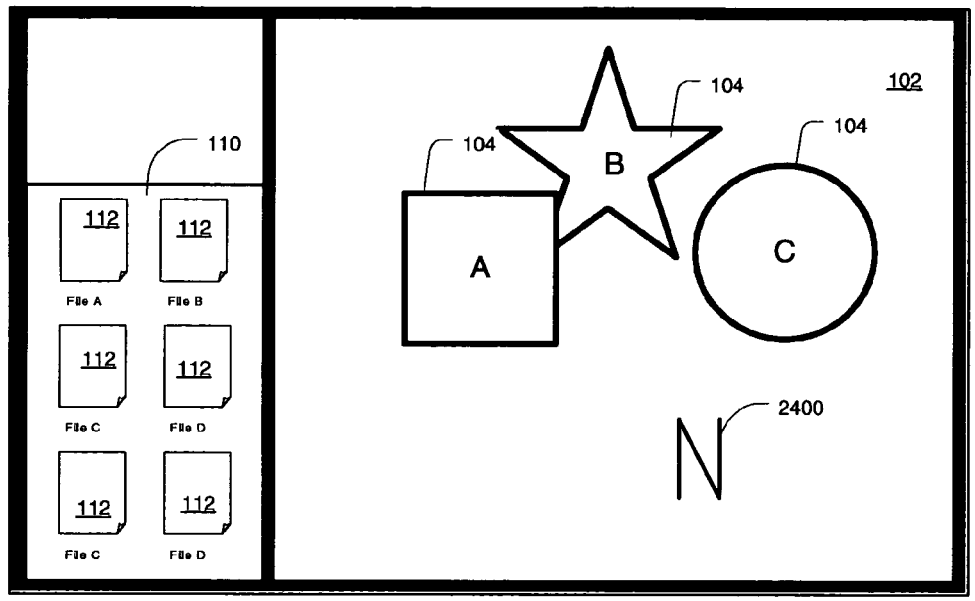
*FIG. 24b*
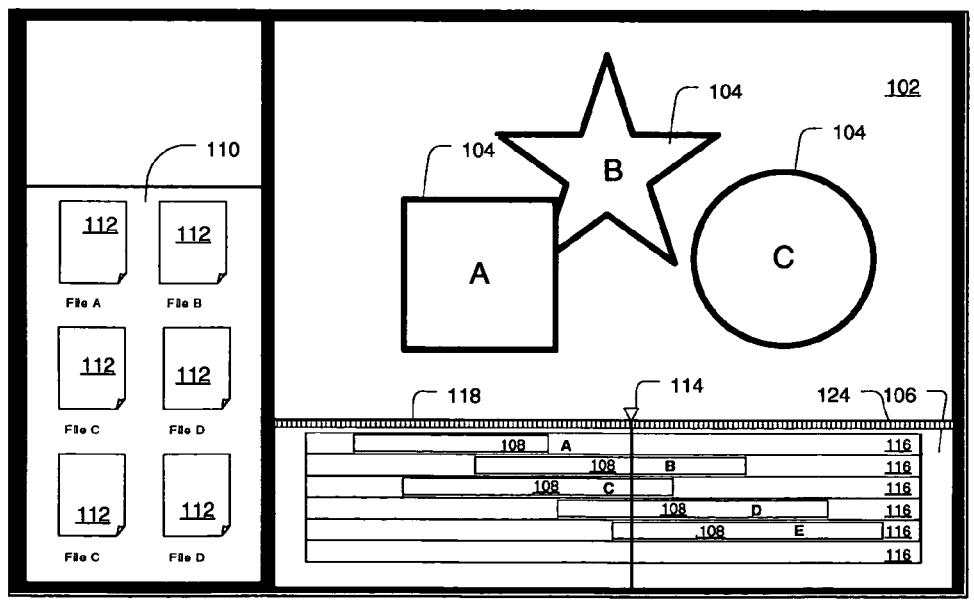
*FIG. 24c*

Delete

Select mode

Show/Hide
Heads Up Display

GESTURE CONTROL OF MULTIMEDIA EDITING APPLICATIONS

CROSS REFERENCE TO RELATED APPLICATIONS

This application is related to the following commonly owned U.S. patent applications, the disclosures of which are incorporated herein by reference:

U.S. patent application Ser. No. 10/826,973 for "Animation of an Object Using Behaviors," filed Apr. 16, 2004 now abandoned.

U.S. patent application Ser. No. 10/826,429 for "Editing within Single Timeline," filed Apr. 16, 2004 now U.S. Pat. No. 7,805,678 issued on Sep. 28, 2010.

U.S. application Ser. No. 09/520,206 (filed Mar. 7, 2000) now U.S. Pat. No. 7,564,995.

FIELD OF INVENTION

The present invention relates to multimedia editing applications in general, and to user interface paradigms for controlling such applications.

BACKGROUND OF THE INVENTION

Multimedia editing applications are used to create various types of multimedia presentations containing multimedia objects. A multimedia object can be a video object, an audio object, an image object, or a combination thereof, which has a temporal aspect in that its content is experienced over time. A typical multimedia presentation may contain multiple different video and/or audio elements. The editing applications typically provide support to create and modify the video and audio elements, and combine such elements into sequences that together form the multimedia presentation.

The user interfaces of conventional editing applications use a direct manipulation paradigm, in which the user operates a mouse or other pointing device to select graphical representations of the multimedia objects, and then select icons, menu items or keystrokes to perform a desired function on the selected objects. For example, a user may select a video object, and select an icon to change the entry point of the video object (the time at which the video object starts) by dragging an entry marker on a graphical timing panel. As another example, the user may start the playback of the multimedia object by clicking on an icon representing a play function, or may "rewind" the object by clicking on an icon associated with a reverse play function. In this type of icon-based control paradigm, three separate steps are required. First, the user must know exactly where on the screen the icon for the desired function appears, second, the user then must move the cursor to this location, and third the user must select, click or drag the icon to achieve the desired functionality. These steps take time and attention away from the user's focus on the particular aspect of the multimedia object being edited.

Another problem with this approach is that each icon takes up screen space and thus the user interface of the application tends to get cluttered up with multiple tool bars, menus, icon palettes and the like in order to present the icons for all of the available functions. For functions that are used frequently, requiring the user to repeatedly access an icon on the screen only serves to slow down the user's work instead of streamlining it. Complex keystroke combinations (e.g., "CONTROL-ALT-P" for "play") are thus used for common functions, but this requires the user to memorize a typically arbitrary mapping of key combinations to functions, and further may require the user to release control of their pointing device in order to access the key board to generate the keystroke. After the keystroke is pressed, the user then must access the pointing device again. Of course, some keystroke combinations may be done with one hand on the keyboard while the other hand retains the pointing device. However, this approach severely limits the number of available keystroke combinations to those that can be pressed with one hand, and further requires a high degrees of dexterity in the user's non-dominant hand, since most users use their dominant hand (e.g., right hand) to control the pointing device, and leave their non-dominant hand on the keyboard. The net result in these situations that the user's attention is directed away from the object to the particulars of the device interface, and thus reduces the user's efficiency.

Gestures have been previously used for entry of limited command in a tablet based computer. In most cases, the gestures are essentially alphabetical characters, such as "G" for the function "goto," or "f" for the function "Find," or "s" for the function "save," and thereby merely represent the word for the function itself, essentially providing an abbreviation of the word. While arbitrary graphical symbols are sometimes used, they do not provide a comprehensive set of useful visual mnemonics.

Accordingly, it is desirable to provide a multimedia editing application that can be controlled by various gestures that have visually mnemonic forms.

SUMMARY OF THE INVENTION

A multimedia editing application uses a plurality of gestures to control certain editing operations of the application. Each gesture is associated with a particular function (or set of functions) of the editing application. A user inputs the gestures with a pointing device, such as a mouse, a light pen, or the like. The editing application includes a gesture recognition engine that receives the input gesture and determines the function associated with the gesture. The application then executes the identified function. The multimedia editing application also supports the ability for the immediate entry ("on demand") of a gesture mode based on user activation of a configured switch (e.g., button) on the gesture input device, such as a graphics pen. This allows the user to seamlessly enter both gestures, select menu items and icons, and draw graphics all without putting the gesture input device aside or using multiple hands. Each gesture is designed such that its geometric form provides a visual mnemonic of the associated function or the object on which the function operates. The visual mnemonic is preferably non-linguistic in that it does not represent a character, letter, or other linguistic symbol which is an abbreviation of a function name.

The use of gestures to control a multimedia editing application provides a more efficient and easier to use interface paradigm over conventional keyboard and iconic interfaces. First, since the gestures can replace individual icons, less screen space is required for displaying icons, and thereby more screen space is available to display the multimedia object itself. Indeed, the entire screen can be devoted to displaying the multimedia object (e.g., a full screen video), and yet the user can still control the application through the gestures. Second, because the user effects the gestures with the existing pointing device, there is no need for the user to move one of his hands back and forth between the pointing device and keyboard as may be required with keystroke combinations. Rather, the user can fluidly input gestures with the pointing device in coordination with directly manipulating elements of the multimedia object by clicking and dragging. Nor is the user required to move the cursor to a particular portion of the screen in order to input the gestures, as is required with iconic input. Third, the gestures provide a more intuitive connection between the form of the gesture and the associated function, as the shape of the gesture may be related to the meaning of the function. Fourth, whereas there is a relatively limited number of available keystroke combinations—since many keystroke combination may already be assigned to the operating system, for example—there is a much larger set of available gestures that can be defined, and thus the user can control more of the application through gestures, then through keystrokes.

In one embodiment, the gestures fall generally into two classes, each of which provides a visual mnemonic of the associated function. The gestures are non-linguistic in that they are not letters, characters, or other symbols which are derived directly from the names of the associated functions. Thus, while a particular gesture may have an geometric form similar to a particular letter, or may be described by reference to the shape of a letter, the gesture's mnemonic qualities do not depend on the geometric form being similar to or derived from (e.g., an abbreviation) of the name of the function with which the gesture is associated.

A first class of gestures are those whose geometric form (or "shape") implies or suggests a temporal or spatial directionality of the associated function. These geometric characteristics also include the directional or motion aspects of the gestures as input (e.g., directionality or curvature of the gesture stroke). Gestures in this class include, for example, gestures to control the playback of a multimedia object either in reverse or forward time, or to move an object in a particular spatial direction. The second class of gestures are those whose shape imply or suggest the form of the object on which the associated function is performed. Gestures in this class include, for example, gestures to manipulate the size of windows, to open or close particular window panels, or the shape of an icon associated with the desired function. The visual mnemonic aspect of a gesture may also connote the movement or shape of particular parts of a human body, such as the motion or shape of a hand, or motion of the head, eyes, or the like.

In one embodiment, a gesture is preferably a single continuous stroke. In another aspect of the invention, some of the gestures may be grouped into gesture pairs of a first and second gesture. The first and second gestures are logical mirror images of each other, (e.g., reflected in either the horizontal or vertical axis). The first gesture is associated with a temporally forward function on a multimedia object (or element), such as forward play, forward fast advance, forward step and the like. The second gesture is associated with a temporally backward function, such as reverse play, reverse fast advance, reverse step and the like. Other gesture pairs include first and second gestures which operate on a beginning portion and an ending portion respectively of a multimedia object or element, such as jump to beginning or jump to end. Other gesture pairs include a first gesture that performs a rescaling operation to increase the scale of displayed objects, and a second gesture that performs a rescaling operation to decrease the scale of displayed objects.

The present invention has embodiments as a multimedia editing application including stored gesture definitions of gestures, and a gesture recognition engine, as various methods of operating a multimedia editing application, as a user interface for a multimedia editing application, as computer program products, and as a library of gestures for controlling a multimedia editing application.

BRIEF DESCRIPTION OF THE DRAWINGS

FIG. 4 illustrates the pause play gesture.

FIGS. 5a-d illustrate the frame forward gesture and associated functionality.

FIGS. 6a-e illustrate the go to start of play range and go to end play range gestures and associated functionality.

FIGS. 16a-f illustrate the zoom in and zoom out gestures and associated functionality.

FIGS. 24a-e illustrate the open/close bottom and top panel gestures and associated functionality.

FIGS. 25a-c illustrate the open/close left and right panel gestures and associated functionality.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
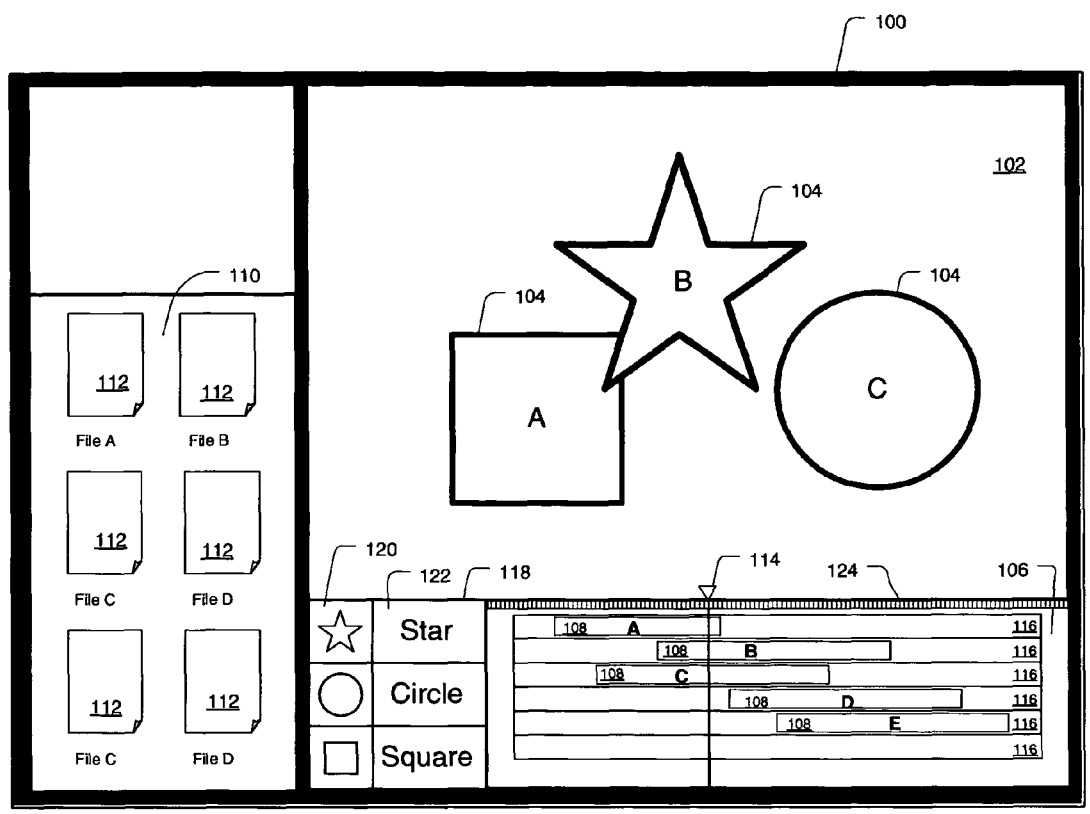
FIG. 1 is a schematic illustration of the user interface of a multimedia editing application in accordance with one embodiment of the invention.

Referring now to FIG. 1 there is shown a schematic illustration of the user interface 100 of a multimedia editing application in accordance with one embodiment of the invention. The illustration is schematic in that it shows the general features of the user interface in wireframe form; those of skill in the art will appreciate that in an actual embodiment, the user interface areas would be variously colored, shaded, and labeled, and provide further toolbars, tool palettes and the like beyond those illustrated here.

The user interface 100 includes three primary regions, the canvas 102, the timing panel 106, and the file browser 110. The canvas 102 is used to display the objects as they are being manipulated and created by the user, and may generally be characterized as a graphics window. In the example of FIG. 1, there are shown three multimedia objects 104, Square A, Circle C, and Star B, which will be referred to throughout as such this disclosure when necessary to reference a particular object 104. In the preferred embodiment, the multimedia application is a non-linear video editing application, and allows the creation of multimedia presentations, including videos. Accordingly, the objects 104 displayed in the canvas 102 at any given time represent the "current" time of the multimedia presentation.

Below the canvas 102 to the right is the timing panel 106. The timing panel 106 shows a linear representation of the overall length of the presentation. At the top of the timing panel 106 is the timescale 124, which shows time markers (e.g., minutes, seconds, 1/10's of seconds, etc.) (not show here for clarity). The timescale 124 can be of the entire presentation from beginning to end, or any portion thereof. The objects 104 in the canvas 102 correspond to the current time on the timescale 124, which is indicted by current time marker 114. For each multimedia object 104 there is a timebar 116 in the timing panel 106. The object 104 is indicated by an object bar 108, which may have the object's name displayed for recognition. The width of the object bar 108 corresponds to the duration of the multimedia object 104, which duration is controlled by the user. The beginning of the object's duration is called the In point; the end of the object's duration is the Out point. These points are established by the user, for example, by selecting and dragging the respective end of the object bar in the desired direction. From the layering of the object bars 108 and their positioning relative to the timescale 124, the user can see the relative start and end times of each object. Notice that the current time marker 114 shows a point in the multimedia presentation at which Square A, Star B, and Circle C are all visible at the same time, as indicated by the overlap of their respective object bars 108. Two other object bars 108 for objects E and F are shown in the timing panel, but the objects are not shown in the canvas 102 because are after the current time.

On the left side of the user interface is the file browser 110. The browser 110 is used to access multimedia object files for use in a multimedia presentation. The browser 110 shows file icons 112 for files in a currently selected directory (whether local or networked). The user can access any of the files in a variety of different ways. For example, the user can drag and drop the icon for a desired multimedia object into the canvas 102 thereby making part of the presentation, with its start time corresponding to the current time.

An optional area of the user interface is the project view panel 118, shown the immediate left of the timing panel 106. The project view 118 provides additional information on each object 104, showing the object's name 112 and a preview 120 of the object by itself. From the preview 120 the user can access a video preview of the object's actions independently of the other objects 104 in the multimedia presentation.

Figure 2:
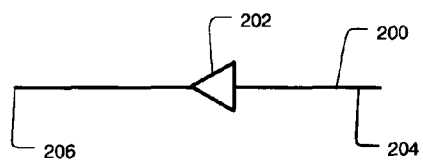
FIG. 2 illustrates the nomenclature used to describe a gesture.

FIG. 2 illustrates the nomenclature that will be used to describe a gesture. A gesture 200 has a starting point 204 and an ending point 206, and is preferably a single continuous stroke between these points. The gesture can be input by the user via any type of pointing device, including a mouse, pen, fingertip, trackball, joystick and the like. The gesture 200 is shown here, as with the remaining illustrated gestures, is shown in prototype form with straight lines and regular angles. However as appreciated by those of skill in the art, in practice, the gestures as input will comprises an irregular line and angles, due to the variability and imprecision of manual input. For purposes of illustration and explanation only, a gesture 200 is shown with a triangular direction of movement marker 202, with the apex of the triangle that coincides with the gesture indicating the direction of movement that the input device would take from the starting point 204 to the ending point 206 in forming the gesture. As will become apparent further below, each gesture 200 has a geometric form (generally "shape") which provides a mnemonic of the function associated with the gesture. Geometric form here is understood to include not merely the resulting planar figure of the gesture once input, but also the spatial, temporal or other characteristics of the gesture as it is being input, such as the directionality or curvature of portions of the gesture, as well as the rate at which the gesture or portions thereof are input, the pressure applied by the user while inputting the gesture, and so forth.

One aspect of the present invention is the ability to directly input the gestures via a direct and immediate mode change effected from the input device itself, rather than having to enter the input mode via a tool bar, menu item, or other intermediate mechanism. In one embodiment, a button or other switch mechanism on the input device, preferably at a fingertip location, is assigned by the multimedia editing application to be the trigger to enter the gesture input mode. For example, a pen type input device typically has two buttons on the pen barrel. One of the buttons may be designated as the gesture mode trigger, and the other button may be designated as the selection control for selecting items in the user interface. To input a gesture, the user simply holds down the gesture mode trigger button while drawing the gesture. The user then releases the button upon completion of the gesture. The multimedia editing application recognizes the input stroke as a gesture (rather than as a graphical object, such as a line). This approach allows the user to enter the gesture anywhere on the user interface, instead of via a dedicated region of the user interface, as is commonly done. In addition, it provides a very fluid and natural way of entering the gestures.

Another aspect of the gestures that will be illustrated below is that the interpretation of the gestures by the multimedia editing application is context sensitive, and in particular is sensitive to which region of the user interface 100 the gesture is input, the object(s) over which the gesture is drawn, or the currently selected object(s). In other words, a given gesture can be associated with a plurality of different gestures, and the multimedia editing application determines which function to execute in response to the gesture according to which region of the user interface receives the gestures from the user. In the preferred embodiment, the different functions associated with a given gestures are semantically related so that they provide a consistent mental model to the user of the underlying functionality of the gesture and the application. These features will be further explained by example below.

Figure 3A:
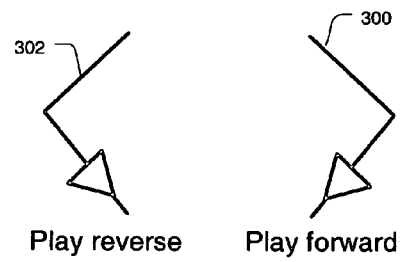
FIGS. 3a-d illustrate the play forward and play reverse gestures and associated functionality.

The present invention provides a number of different gestures for controlling the functionality of the multimedia editing application. The gestures can be grouped as follows, according to their functionality, as follows:

1. Transport and playback
2. Timing panel navigation
3. Editing
4. View management
5. General Transport and Playback Referring now to FIG. 3a there is shown the first of the transport gestures, the play forward gesture 300 and the play reverse gesture 302. These gestures are part of the class in which the gesture's shape is a mnemonic for the temporal directionality of the associated function. Thus, the apex of the play forward gesture 300 points to the right, which is understood to be the forward direction in time (towards positive numbers), while the apex of the play reverse gesture 302 points to the left, which is understood to be the reverse time direction (towards negative numbers). The play forward gesture 300 may also be described as an angle open to the left, with a right pointing apex. The play reverse gestures may likewise be described as an angle open to the right, with a left pointing apex.

Figure 3B:
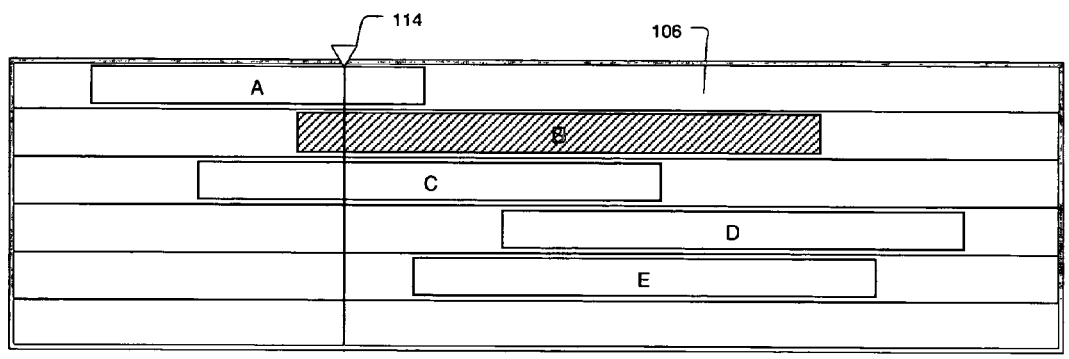
Figure 3C:
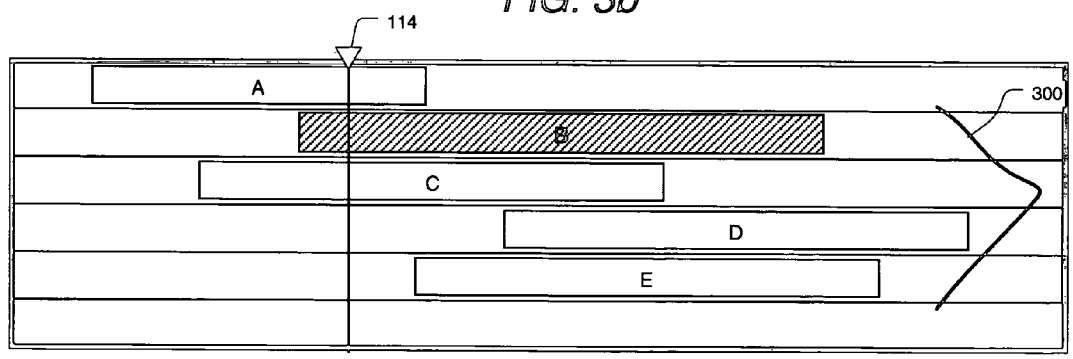
Figure 3D:
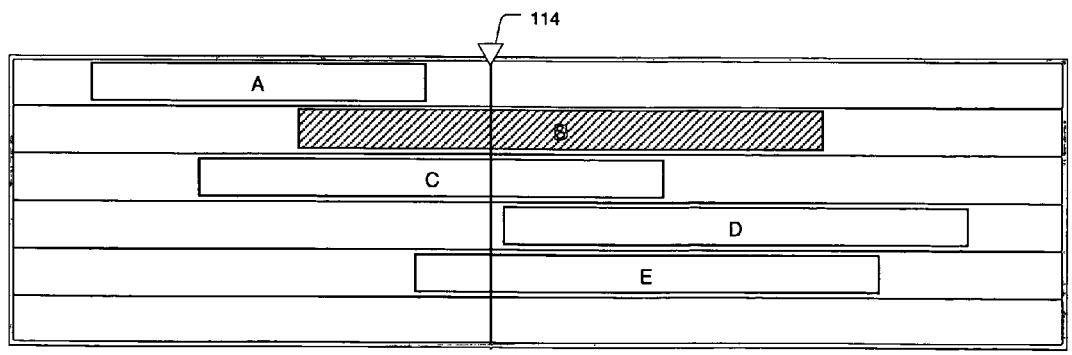

FIGS. 3b-3d illustrate the effect of the play forward gesture 300, when input into the timing panel 106. In FIG. 3b there is shown just the timing panel 106 before the gesture is received. The current time marker 114 is set at some point in time. In FIG. 3c, the user inputs, and the multimedia editing application receives, the play forward gesture 300, shown here in schematic form. While the gesture is shown as input on the right side of the timing panel 106, it may be input into any area of timing panel 106, as is the case with the other gestures. In FIG. 3d, the multimedia editing application executes the function associated with this gesture, and has begun forward play back of the multimedia presentation, which is illustrated here by the forward advanced position of the current time marker 114, and the forward pointing arrow below the timing panel (the arrow is shown for illustration only, and would not appear in the user interface itself). The various objects 114 are accordingly animated in the canvas 102 (or output as audio). This is not shown here to simply the explanation.

The play reverse gestures 302 operates in the opposite manner naturally, and thus would play the multimedia presentation in reverse from the current time, as indicated by the current time marker 114.

In a preferred embodiment, the user may modify the functionality associated with the gesture (and hence change its semantics) by using various modifier operations. One class of modifier operations are key combinations, in which the one or more keys on the keyboard are depressed while the gesture is input. Another class of modifier operations are button presses on the input device.

For key combinations, the following modifier keys may be used in conjunction with many of the gestures that are described herein: the SHIFT key, the COMMAND key, and the ALT key.

In the context of the play forward or play reverse commands, these modifier keys have the following effects:

SHIFT: Play forwards/reverse from start or end of multimedia presentation. This modifier causes the multimedia editing application to begin the playback at either the start of the entire multimedia presentation or the end, depending on the gesture.

COMMAND: Play the currently selected object 114 from its In and Out points, according to the direction of play of the gesture. Thus, if COMMAND is used with the play forward gesture 300 the currently selected object is played from its In point to its Out point. If COMMAND is used with the play reverse gesture 302, then playback is from the Out point to the In point. The playback is for all objects in the multimedia presentation that have a duration during this extent of time.

ALT: Play the multimedia presentation in a continuous loop.

The play forward gesture 300 and play reverse gestures 302 are an example of pairs of gestures are whose prototypes are substantially mirror images of each other, (e.g., reflected in either the horizontal or vertical axis). Other examples of these mirror image gesture pairs will be apparent throughout the rest of this disclosure.

The play forward gesture 300 and the play reverse gestures 302 are also context dependent gestures, and the multimedia editing application determines the appropriate functionality based on the window in which the gesture is input, the object(s) 114 over which it is drawn, or the currently selected object(s). Thus, in the file browser, a play forward gesture 300 input over one of the file icons 112 cause the multimedia editing application to playback the associated file, whether it is a video, audio, or other type of multimedia object. The playback of these files occurs in a separate preview window (not shown) if the object has a visual component, or just by auditory output. Similarly, if one of these gesture is input into the canvas 102, then the multimedia editing application plays back the currently selected multimedia object 114, showing its associated animation. If the gesture is input over the preview field 120 in the project view 118, then again the playback is in a preview window, or by auditory output (or both).

FIG. 4 illustrates the pause play gesture 400. This gesture is used to pause the current playback, whether it is of a currently selected object, set of objects, a preview, audio playback, or the entire multimedia presentation. Again, this gesture's geometric form, a downward stroked vertical line, is a mnemonic of the directionality of the function, as the notion of stopping or pausing something in motion can be imagined as a straight downward motion to hold the object in place.

Referring now to FIG. 5a there is shown the frame forward gesture 500 and the frame reverse gesture 502. These gestures are associated with the functions of a single frame advance in the forward or reverse directions respectively. As with the play forward gesture 300 and the play reverse gestures 302, these gestures mnemonically indicate their associated functionality by their visual directionality. The frame forward gesture 500 is a short generally horizontal stroke starting from the left and proceeding to the right, hence in the forward time direction in an incremental fashion. The frame reverse gesture 502 is the logical complement of this, starting from the right and proceeding generally horizontally to the left, hence in the reverse time direction in incremental fashion.

FIGS. 5b-5d illustrate the functionality of the frame forward gesture 500. In FIG. 5b, there is shown the timing panel 106 before the gesture is received. The current time marker 114 is positioned at the current time. In FIG. 5c, the user inputs, and the multimedia editing application receives, the frame forward gesture 500, shown here in schematic form. In FIG. 5d the current time marker 114 has been advanced a single frame. In the canvas 102, the corresponding objects 114 that are present during the current frame are likewise updated to show their positions during the next frame (which obviously becomes the current frame). The frame reverse gesture 502 reverses the current time marker 114 a single frame.

The frame reverse gesture 502 and frame forward gesture 500 can each be modified with a modification operation. When used in conjunction with SHIFT, the frame forward gesture 500 operates to jump the current time marker 114 ten (10) frames forward in time, and likewise when used with the frame reverse gesture 502, operates to jump the current time marker 114 backwards ten (10) frames. In one embodiment, the user can define the number of forward or reverse frames to jump when the SHIFT modifier is used.

The frame forward gesture 500 and the frame reverse gesture 502 are also context dependent. When used in during the playback of a preview (e.g. of a video object) in a preview window, they act as above to forward or advance the playback a single frame at time (or plural frame when input with SHIFT). When used during the playback of an audio object, they act to advance the audio playback one (1) second forward or backward in time (or ten (10) seconds forward or backward, when input with SHIFT).

Timing panel Navigation

The next group of gestures are associated with functions for navigation of the timing panel 106. These gestures generally effect the location of the current time marker 114 in the multimedia presentation, and thus effect both the timing panel 106, and the appearance of objects in the canvas.

FIG. 6a shows the go to start of play range gesture 600 and the go to end of play range gesture 602. The geometric form of the go to start of play range gesture 600 is a right facing, right angle with a downward end stroke. The geometric form of the go to end of play range gesture 602 is a left facing, right angle with a downward end stroke. The visual mnemonic of these gesture connotes pointing at the beginning (to the left) or ending (to the right) of an object. These gestures adjust the current time marker 114 in the timing panel 106 as follows. The user can specify a play range in the timing panel 106, which defines a duration or period of interest to the user, say for example a period of 10 seconds starting at 01:25 (ss:mm) and ending at 01:35. The playback functions are aligned with this play range, and so the user can repeatedly playback this limited play range in order to focus on editing during this portion. The user sets the beginning and end of the play range in the timing panel, for example, by placing play range markers 119, as shown in FIG. 6b. The left most play range marker 119 indicates the beginning of the play range, and the right most play range marker 119 indicates the end of the play range. Now, when the user inputs the go to start of play range gesture 600, as illustrated in FIG. 6b, then the multimedia editing application adjusts the current time marker 114 to be set at the time of the beginning play range marker, as shown in FIG. 6c. As is apparent in FIG. 6a, these gestures also form a mirror image pair of gestures. These gestures are also visual mnemonics to the user of the directionality of the associated functions.

The objects in the canvas as updated in response to the adjustment of the current time marker 114. Notice that in FIG. 6b, objects A, B, and C are visible on the canvas 102. At the beginning of the play range, as shown FIG. 6c, only object A, the square is visible. This is because as can be seen from the timing panel, as both the Star B and the Circle C have their respective In points after the beginning of the play range. In addition, Square A has been moved back to its position at that time and rotated.

Figure 6D:
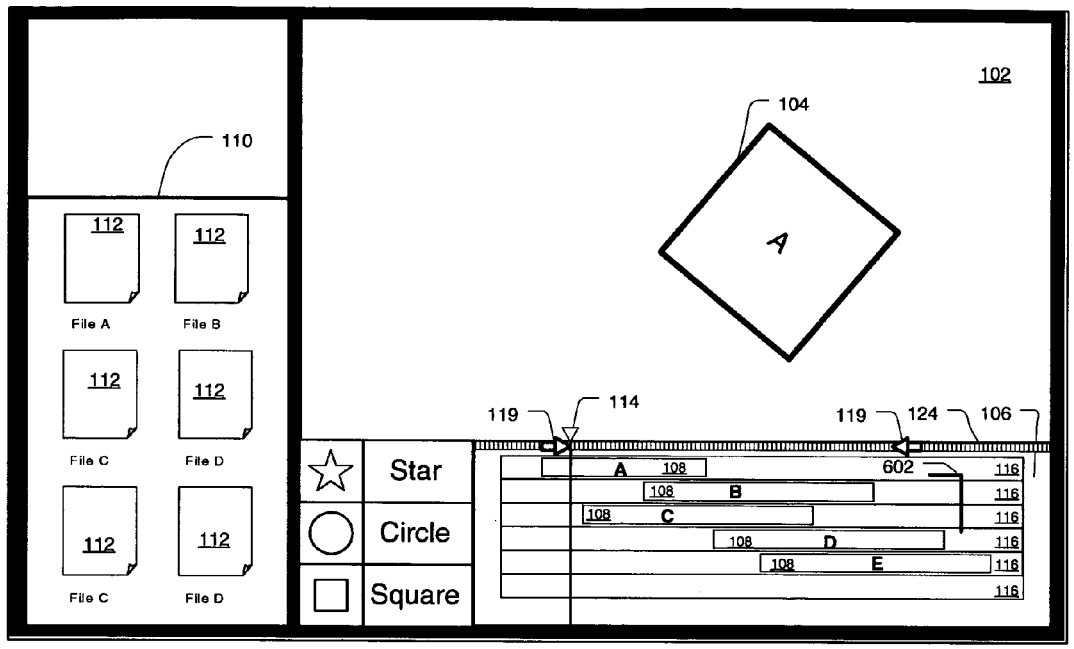
Figure 6E:
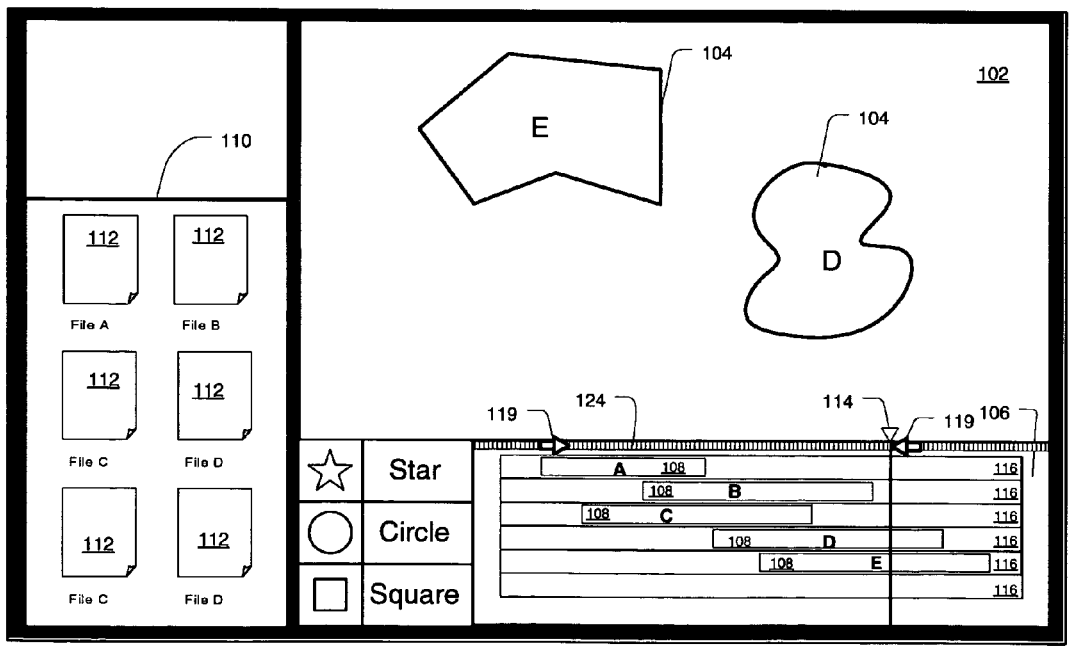

FIG. 6d shows the user interface at the same point in time as FIG. 6c, but now the multimedia editing application has received the go to end of play range gesture 602. The multimedia editing application responds by adjusting the current time marker 114 to the end of play ranger marker 119, as illustrated in FIG. 6e. Again, note that the objects 104 in the canvas 102 have been updated as well, since at the end of play range, only objects E and D are visible, as can be seen from the object bars 108 for these objects which are the only ones which intersect the current time marker 114. The go to end of play range gesture 602 operates in a complementary manner and is not illustrated here as its function and result should now be apparent to those of skill in the art.

The go to start of play range gesture 600 and go to end of play range gesture 602 are also context sensitive gestures. When input while the user is in the browser, for example, previewing an audio or video file, these gestures will cause the multimedia editing application to go to the beginning (go to start of play range gesture 600) or end (go to end of play range gesture 602) of the currently playing file.

Figure 7A:
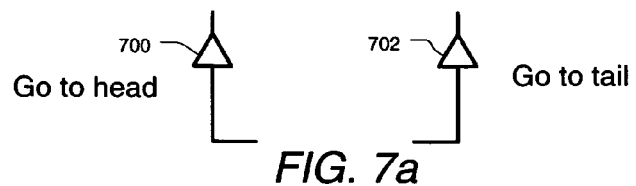
FIGS. 7a-c illustrate the go to head and go to tail gestures and associated functionality.
Figure 7B:
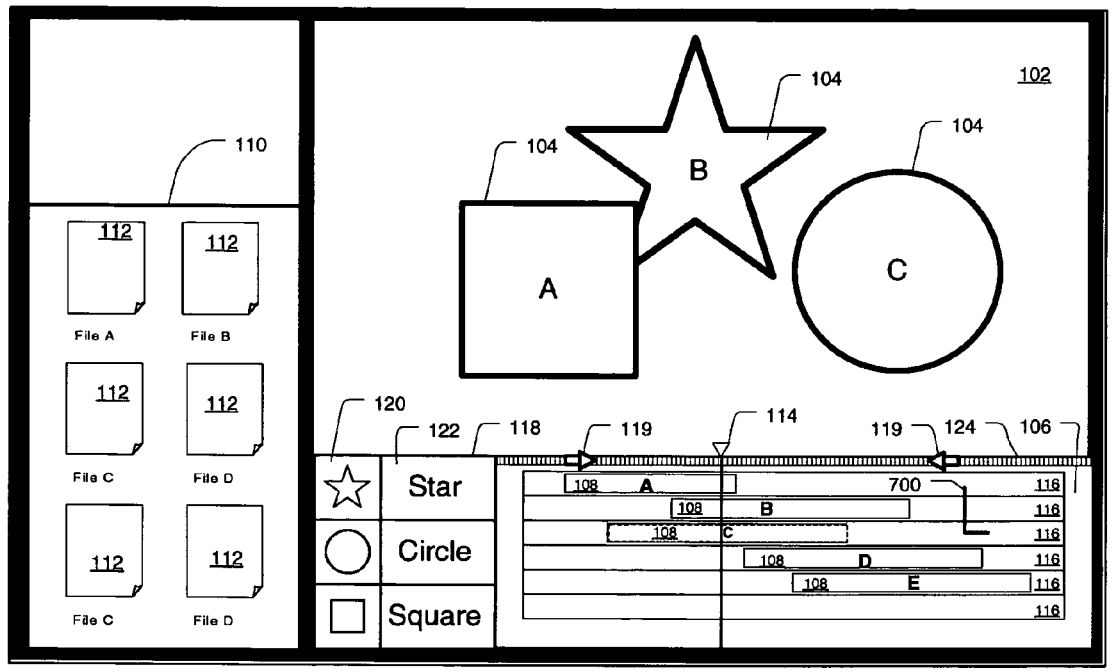
Figure 7C:
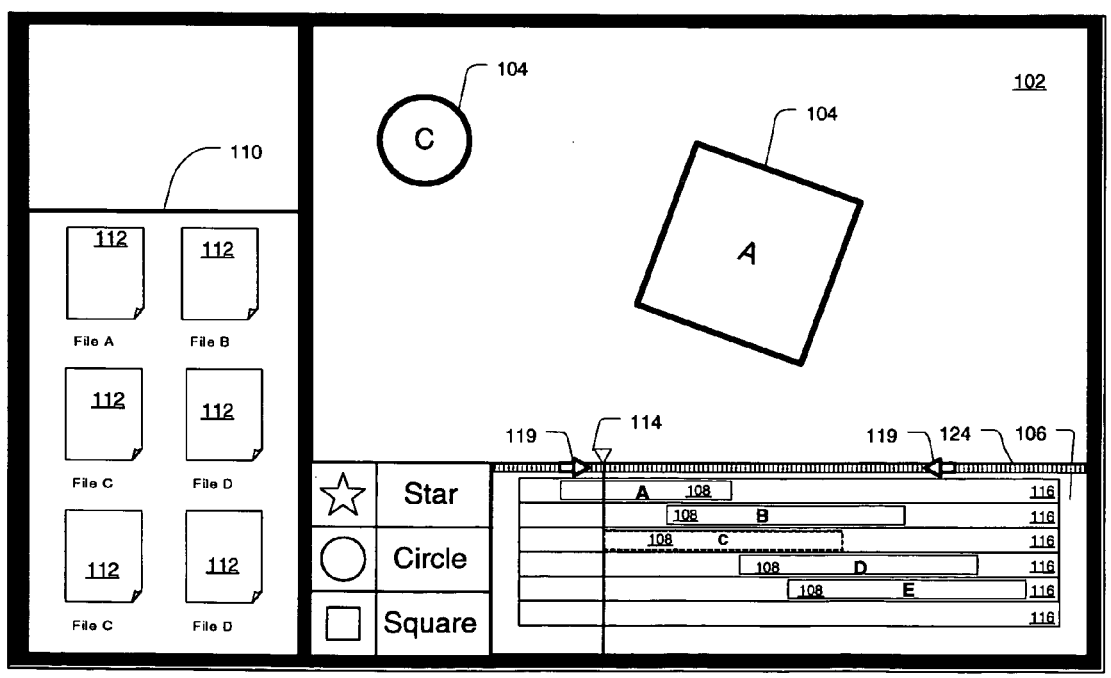

Referring to FIG. 7a there is shown a further pair of navigation gestures, the go to head gesture 700 and go to tail gesture 702. These gestures are also visual mnemonic gestures, as they represent a directional movement to the beginning or ending of an object. Here the go to head gesture 700 is a left 90° angle with an upward end stroke, and the go to tail gesture 702 is a right 90° angle with an upward end stroke. The go to head gesture 700 is associated with a function of adjusting the current time marker 114 to the head, or beginning time, of the currently selected object (or group). The go to end of play range gesture 602 is associated with adjusting the current time marker 114 to the tail, or end time, of the currently selected object's duration. FIG. 7b shows the user interface as the user inputs the go to head gesture 700. The currently selected object 114 is object C, which has its object bar 108 shown in dotted outline. FIG. 7c shows the resulting adjustment of the current time marker 114 to coincide with the beginning of object C's object bar 108, and hence its beginning in the project's duration. Of course, the canvas 102 is likewise updated to show the corresponding frame of the project right at the point at which object C, the circle, first appears, and the then current position of Square A. The go to tail gesture 702 operates in a complementary fashion, and is not illustrated here, as its function and result should now be apparent to those of skill in the art.

Figure 8:
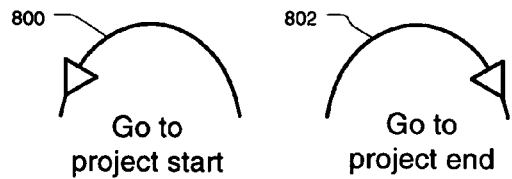
FIG. 8 illustrates the go to project start and go to project end gestures.

Referring to FIG. 8, there is shown a further pair of navigation gestures, the go to project start gesture 800 and the go to project end gesture 802. The project time of a project is the beginning of the project's duration (e.g., the first frame), and the tail is the very end (e.g., the last frame) of the project's duration. These frames correspond to the beginning and end of the timing panel for the project. The geometric form of the go to project start gesture 800 is the upper half of a circle (upper semi-circle) stroked from right to left. The geometric form of the go to project end gesture 802 is an upper semi-circle stroked from left to right. Again, the stroke directions of these gestures is associated with forward or reverse time functions. The functions of these gestures are similar those associated with the go to start of play range gesture 600 and go to end of play range gesture 602, but instead cause the multimedia editing application to adjust the current time marker 114 to the project's starting frame or ending frame respectively, with the corresponding updates to the canvas. The effect of these gestures in the user interface of the multimedia editing application is not illustrated here, as their functions and results should now be apparent to those of skill in the art.

Editing

The next group of gestures are used to perform various editing functions in the multimedia editing application.

Figure 9A:
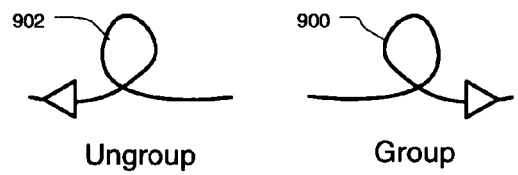
FIGS. 9a-g illustrate the group and ungroup gestures and associated functionality.

Referring to FIG. 9a, the first pair of editing gestures is the group gesture 900 and the ungroup gesture 902. The group gesture 900 causes the multimedia editing application to group together as single unit any number of currently selected objects 104 (or groups), whether they are audio, video, text, graphics, or any other combination of types. The ungroup gesture 902 correspondingly causes a selected group (or set of groups) to be ungrouped to its constitute elements (be they further objects 104 or groups). The shape of these gestures are mnemonics for the semantic form of the underlying action. The group gesture visually represents the encircling of an area within the loop shape, thereby suggesting the gathering or clustering of items. This gestures also has a directional mnemonic aspect, as it proceeds from a left starting point through the loop to the right end point. The left to right motion connotes a "doing" type action (similar to a forward action). The ungroup gesture 902 thus complements this gesture, by having the same general shape, but the reversed directionality, going from the right end starting point to the left end point, and thus connoting an "undoing" type action (similar to a reverse action), here the undoing of the grouping function.

Figure 9B:
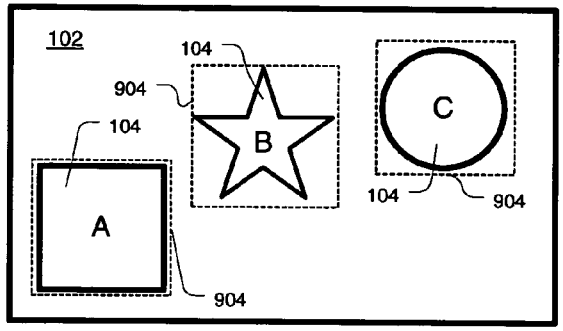
Figure 9E:
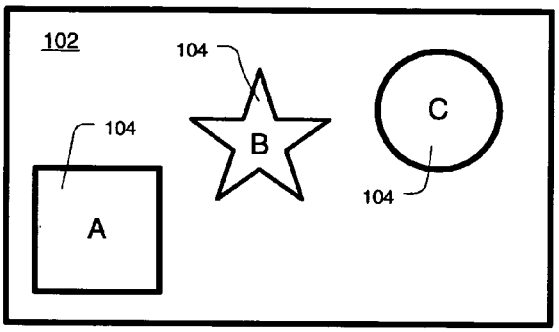
Figure 9C:
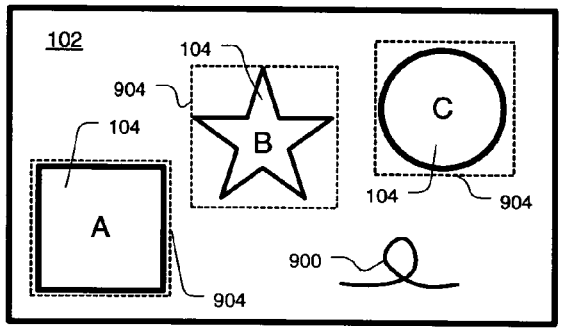
Figure 9F:
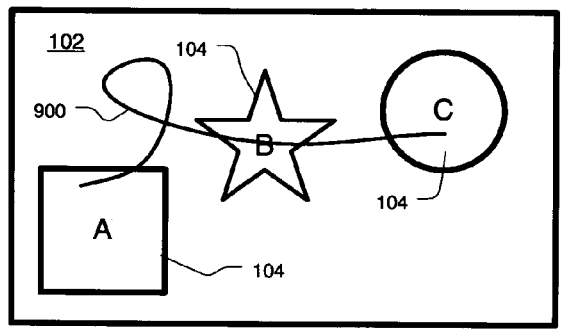
Figure 9D:
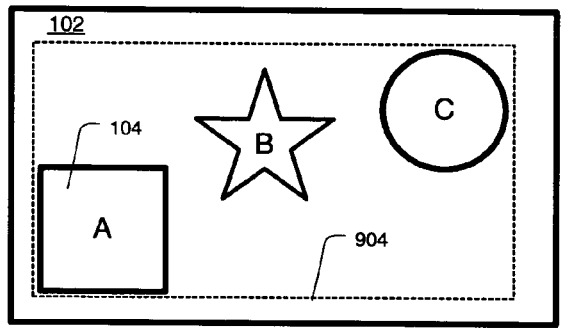
Figure 9G:
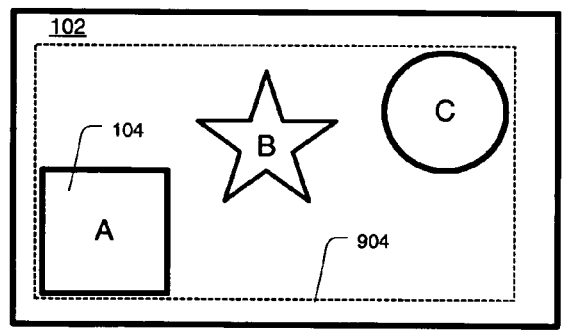

FIGS. 9b-9d illustrate the functionality of the group gesture 900 in the context of the canvas 102. FIG. 9b illustrates a number of objects 102 that have been individually selected by the user, as indicated by their respective selecting boxes 904. FIG. 9c illustrates the multimedia editing application receiving the group gesture 900 from the user. FIG. 9d illustrates the result of the grouping function applied by the multimedia editing application, showing that all three objects 104 are now grouped together, as indicated by the single selection box 904 surrounding the objects 104. The ungroup gesture 902 gesture would reverse this and similar operations, and is not further illustrated here as its functionality and result are apparent to one of skill in the art.

Another embodiment of the group gesture 900 and ungroup gesture 902 does not need the user to select the objects 104 prior to inputting the gesture. Instead, in this embodiment, the user draws the group gesture 900 over each of the objects of interest, in essence "touching" each object to be grouped. FIG. 9e illustrates the canvas 102 with objects 104 before this embodiment of the group gesture 900 is input. FIG. 9f illustrates this embodiment of the group gesture 900 as input, wherein the beginning of the gesture starts in Square A, progresses through Star B, and ends in Circle C. The loop portion of this gesture can occur in other locations relative to the objects than as illustrated.

Figure 10A:
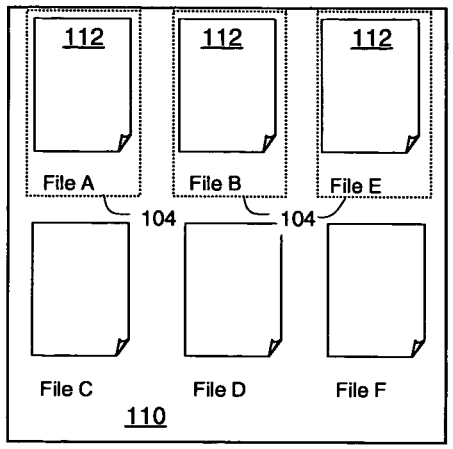
FIGS. 10a-c illustrate the group gesture functionality in the context of the file browser.
Figure 10B:
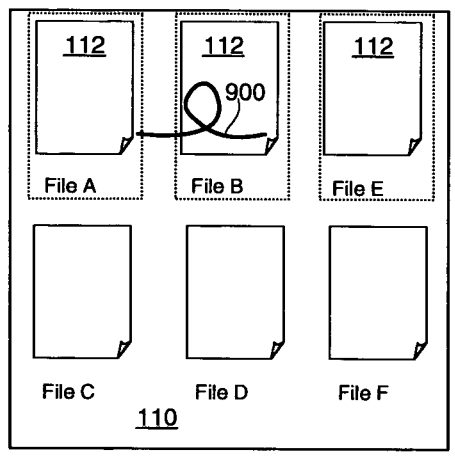
Figure 10C:
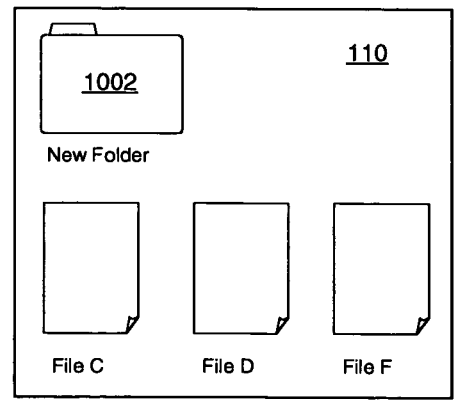

The group gesture 900 and ungroup gesture 902 are context dependent. In the file browser 110, the group gesture 900 results in the creation of a directory (or folder) containing the selected files. The ungroup gesture 902, when applied to a user selected directory object, results in all of the contents of the directory being removed, and placed as the same directory level as the directory itself, leaving the directory object empty. In one embodiment, the directory object may be left in place, or deleted, according to a user selectable option. FIGS. 10a-c illustrate the functionality of the group gesture 900 in the file browser 110. In FIG. 10a, there is shown the file browser 110 at some level of a directory structure, so that the user sees at least some of the files 112 in this directory. Three of the files, Files A, B, and E, have been selected by the user, as indicated by the selection boxes 104 around each file. FIG. 10b illustrates the multimedia editing application receiving the group gesture 900 from the user. FIG. 10c illustrates the result of the grouping function as applied by the multimedia editing application, showing that the application has caused the underlying file system to create a new folder 1002, into which Files A, B, and E have been moved. The user can now perform standard file operations on the folder, such as rename it, move it, or delete it. Thus, in the file browser 110, the group gesture 900 takes on the semantics of grouping a set of files into a common entity, which corresponds to the mental model of forming a folder containing the objects. The alternate version of the group gesture 900 as discussed above, may also be used in the file browser 110.

The group gesture 900 may also be used in the project view 118 as illustrated in FIG. 1. As noted above, the project view 118 shows a list of the multimedia objects 104 in the multimedia presentation. The user can select any combination of these object 104 using standard selection methods, and then input the group gesture 900 into the project view 118 area. The multimedia editing application in response groups the selected objects 114.

The functionality of the ungroup gesture 902 in the file browser should now be apparent to those of skill in the art without further illustration.

Figure 11A:
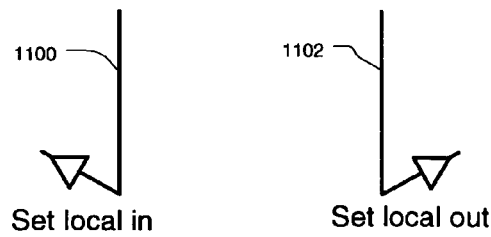
FIGS. 11a-d illustrate the set local in and set local out gestures and associated functionality.

FIG. 11a illustrates the next pair of editing gestures, the set local in gesture 1100 and the set local out gesture 1102. The set local in gesture 1100 established an In point for a currently selected multimedia object 104 at the current time marker 114 (and hence the current frame). The set local out gesture 1102 sets the Out point for the currently related multimedia object 104 at the current time marker 114. The geometric form of the set local in gesture 1100 is a first downward vertical stroke portion, with a second, upwardly angled, left oriented end stroke portion. The left oriented end portion "points" to the beginning of the selected object, hence its In point. The geometric form of the set local out gesture 1102 is a first downward vertical stroke point, with a second, upwardly angled, right oriented end stroke portion. The right oriented end portion "points" to the end of the selected object, hence its Out point.

Figure 11B:
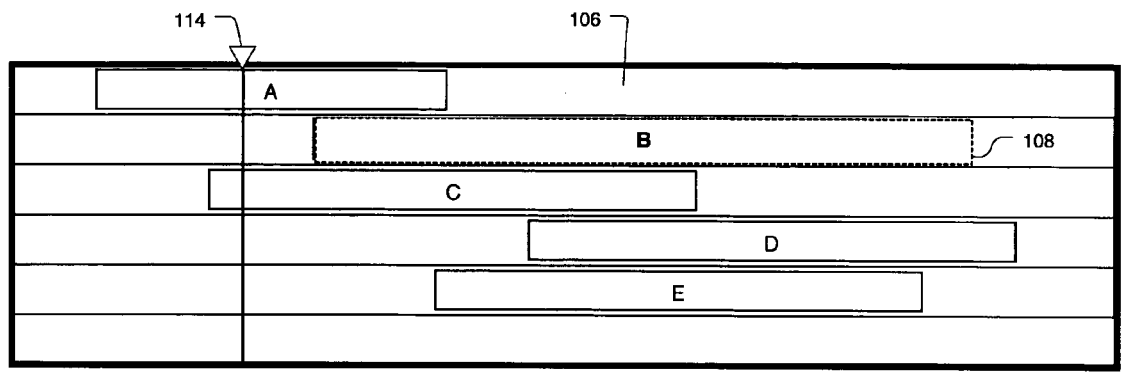
Figure 11C:
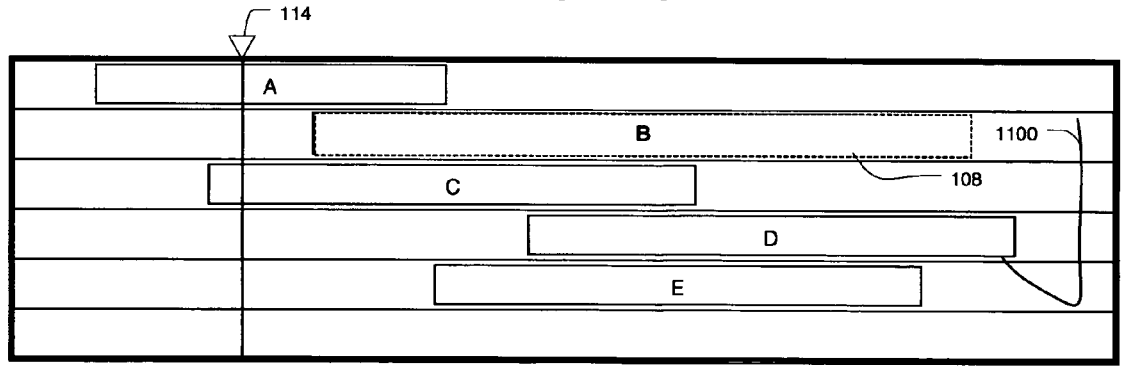
Figure 11D:
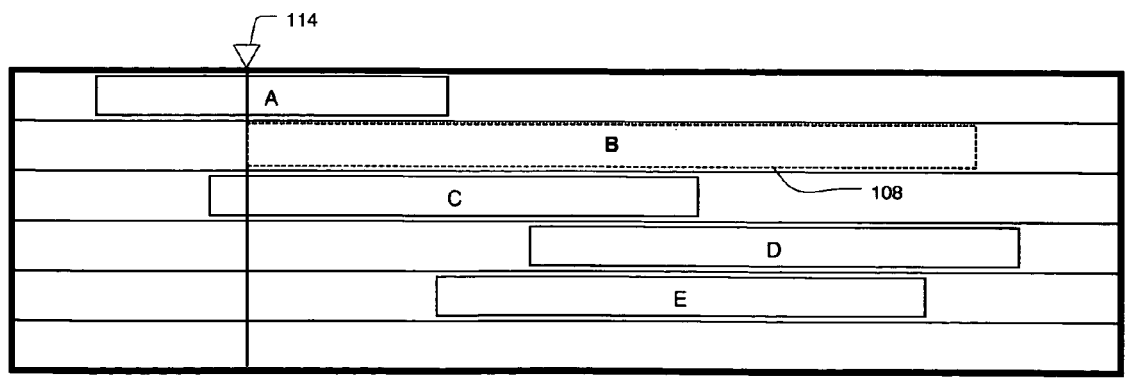

FIGS. 11b-11d illustrate this functionality. In FIG. 11b there is shown the timing panel 106 with object bars 108 for objects A, B, C, D, and E. The object bar 108 for object B is selected, as indicated by its dotted outline. Notice that object B's In point is currently after the current time marker 114. In FIG. 11c, the user has input the set local out gesture 1102. In FIG. 11d, the multimedia editing application has responded to the set local out gesture 1102 by adjusting its In point so that coincides with the current time marker 114. The duration of object B has thus increased, as the object's Out point has remained fixed. Of course, the user could have set the local In point so as to reduce the duration of an object as well. The set local out gesture 1102 operates in a complementary fashion, and is not further illustrated here.

Figure 12A:
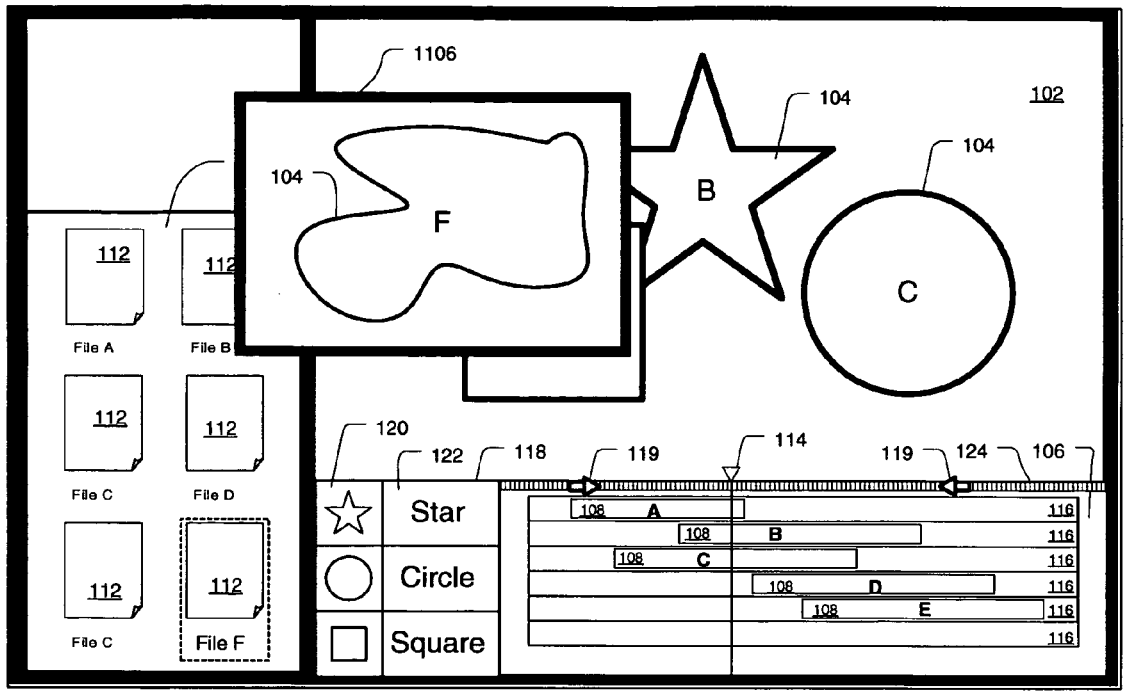
FIGS. 12a-c illustrate the set local in gesture functionality in the context of the file browser.
Figure 12B:
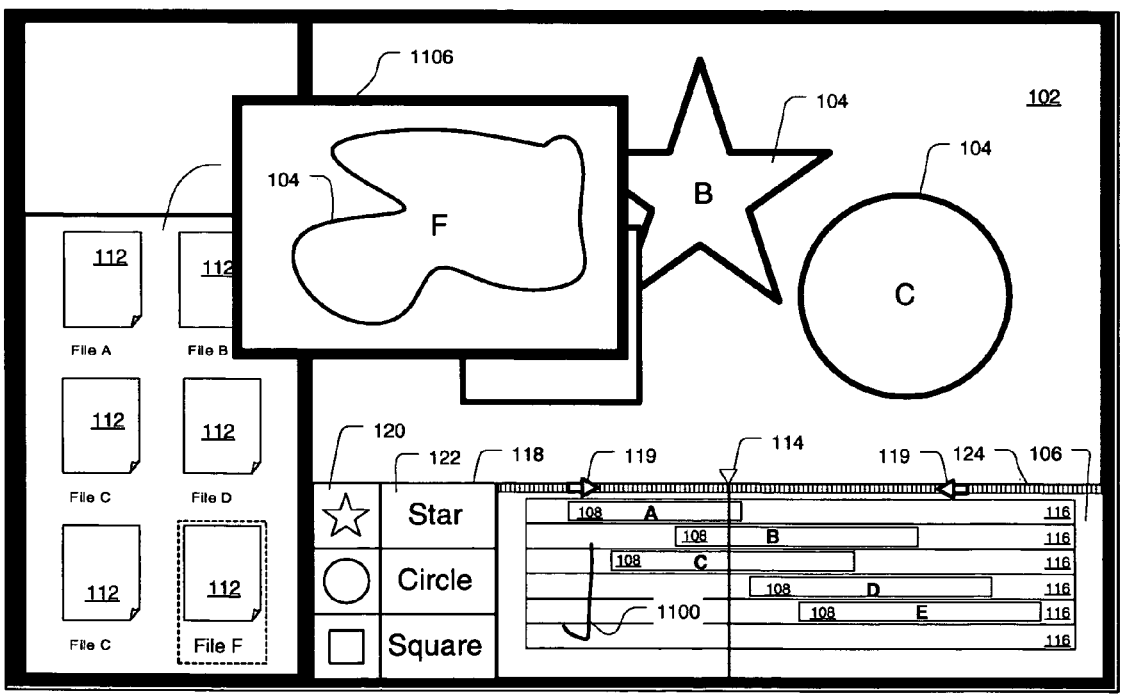
Figure 12C:
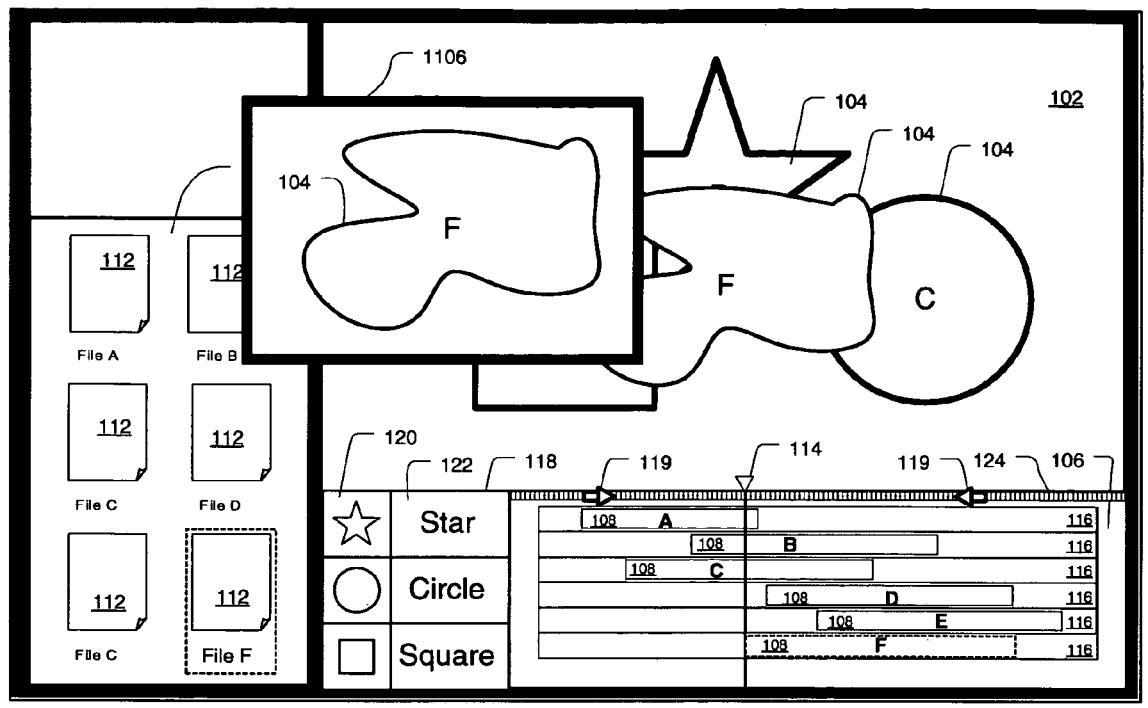

The set local in gesture 1100 and set local out gesture 1102 are also context sensitive. The user can input these gestures while viewing preview of a file from the file browser 112, or when a particular file 112 is selected in the browser 112. If the user inputs the set local in gesture 1100 when viewing or selecting a file, then the object represented by the file is inserted into the multimedia presentation and its In point is set at the current time. FIGS. 12a-12c illustrates this function. In FIG. 12a there is shown the user interface of the multimedia editing application as the user reviews a preview of a file 112, File F, selected in the browser 110. The preview shows object F in preview window 1106. In FIG. 12b, the user has input the set local in gesture 1100 into the timing panel 106 while viewing the preview 1106 of this object. FIG. 12c illustrates the results of this gesture, whereby the multimedia editing application has instantiated an instance of object F into the canvas 102 (shown in front of the other objects, and behind preview window 1106), and has likewise added an object bar 108 for object F into the last track 116 of the timing panel. The In point for this object is set to the current time marker 114, and its extent lasts for the duration of the object. The use can now further adjust the In and Out points of this object as desired.

Figure 13A:
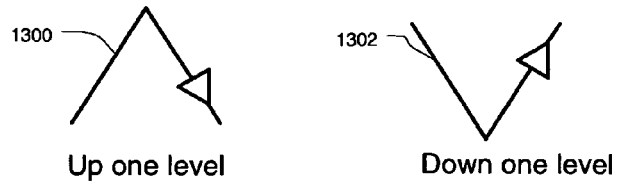
FIGS. 13a-f illustrate the up one level and down one level gestures.

The next pair of editing gestures are for changing the order (layer) of a select object or set of objects. These are the up one level gesture 1300 and the down one level gesture 1302, as illustrated in FIG. 13a. The up one level gesture 1300 moves the selected object 104 "up" (toward the top) one level in a stack of objects. The down one level gesture 1302 moves the selected object 104 "down" (toward the bottom) one level in the stack. The geometric form of the up one level gesture 1300 is an angle open towards the bottom of the screen, with an upward pointing apex, thereby suggesting an upward motion. The geometric form of the down one level gesture 1302 is an angle open towards the top of the screen, with a downward pointing apex, thereby suggesting a downward motion.

Figure 13B:
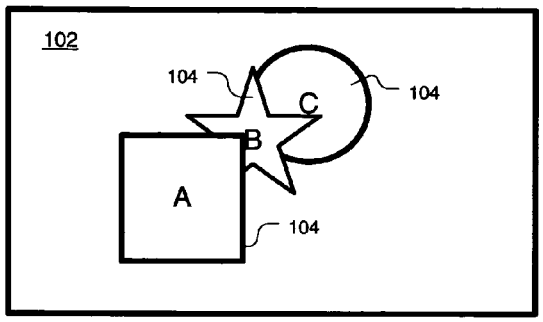
Figure 13E:
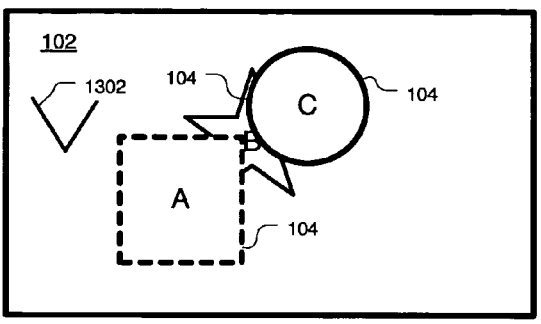
Figure 13C:
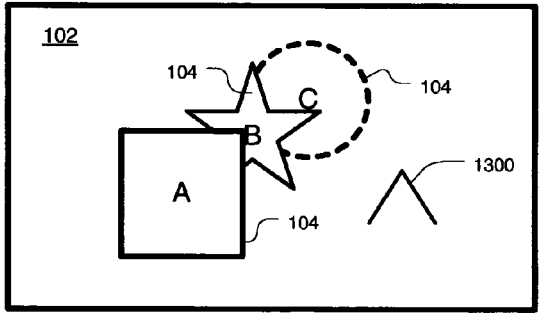
Figure 13F:
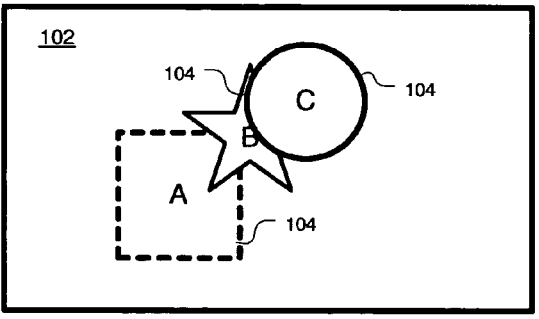
Figure 13D:
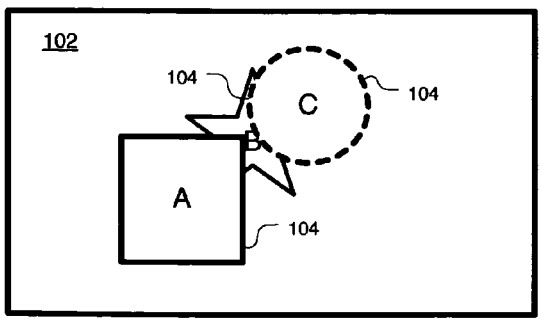

FIGS. 13b-13f illustrates these associated functions. In FIG. 13b, there is shown three objects 104, Square A, Star B, and Circle C, in that order with Square A on top of the stack, and Circle C on the bottom. The objects are illustrated as overlapping to better show their relationship to each object's position in the stack to the other objects; of course in practice objects need not overlap for these functions to be useful. In FIG. 13c, Circle C is the selected object 104, as shown by its dashed outline. The user has input the up one level gesture 1300. In FIG. 13d, Circle C has been moved forward on level, and now is positioned in front of Star B. In FIG. 13e, the user has selected Square A, and input the down one level gesture 1302. FIG. 13f illustrates the result of this associated function, showing that Square A has been moved down one level. For both of these gestures, the object's associated object bar 108 in the timing panel 106 is likewise adjusted up or down as appropriate.

These gestures may be used with various modifiers. The SHIFT key modifies the up one level gesture 1300 to bring the selected object to the topmost position of the object stack ('bring to front'), and modifies the down one level gesture 1302 to push the selected object to the bottom of the object stack ('send to rear'). In addition, these gestures work with a set of multiple selected objects 104 as well.

The up one level gesture 1300 and down one level gesture 1302 are also context sensitive. In the timing panel 106, the use can select an object bar 108 for an object 104, and apply the desired gesture, which in turn promotes ore demotes the selected object 104 in the object stack, and updates it positioning in the tracks 116 of the timing panel. In the file browser 110, the up one level gesture 1300 moves a select object(s) from its current directory (folder) up to the parent directory of the current directory. The down one level gesture 1302 moves a selected object(s) from the current directory into the a selected child directory of the current directory, where child directory is selected either by the user (e.g., via concurrent selection of the object and the directory), or automatically (e.g., first child directory based on sort order, whether alphabetical, by modification date, creation date, or other attribute).

FIGS. 14a-14d illustrates the next pair of editing gestures, the set global marker gesture 1400 and the set local marker gesture 1402. The geometric form of the set global marker 1400 is a first stroke portion comprising an angle open towards the bottom of the window with an upward pointing apex, and a second, ending stroke portion connected to the angle and comprising a short horizontal line segment. The geometric form of the set local marker 1402 is a first stroke portion comprising an angle open towards the top of the window with an downward pointing apex, and a second, ending stroke portion connected to the angle and comprising a short horizontal line segment.

Figure 14A:
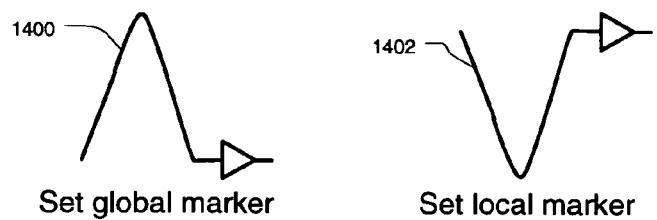
FIGS. 14a-g illustrate the set global marker and set local marker gestures and associated functionality.
Figure 14B:
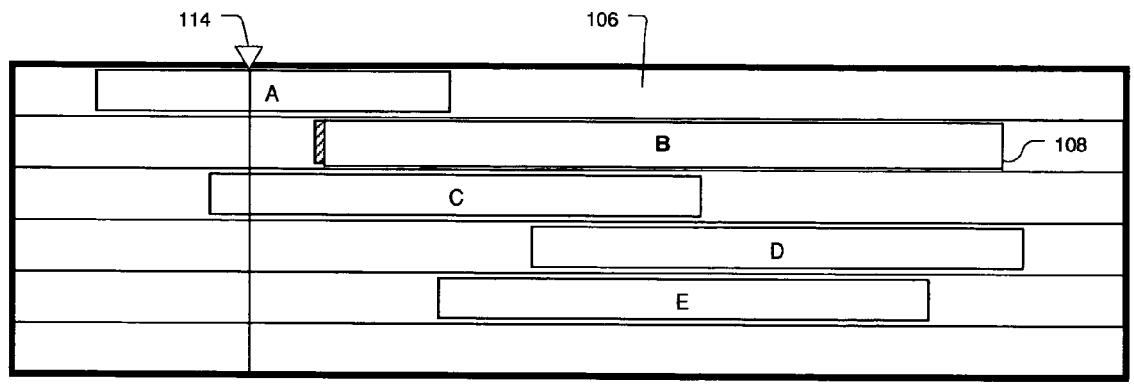
Figure 14C:
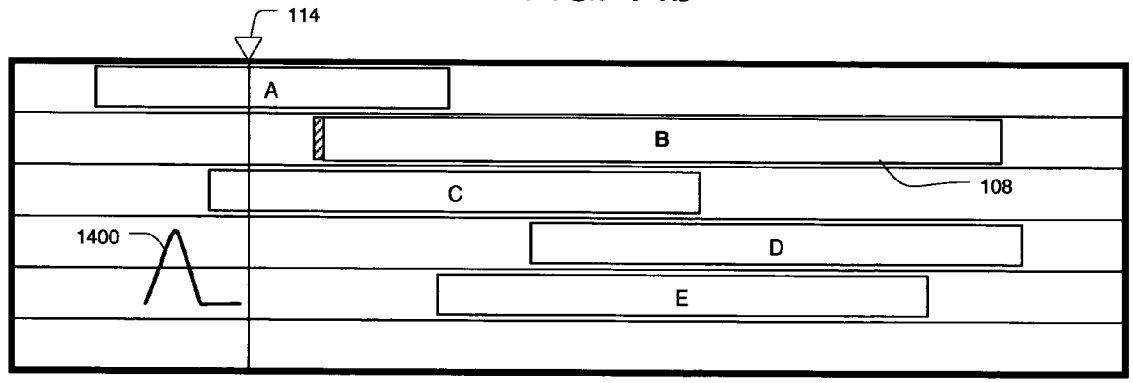
Figure 14D:
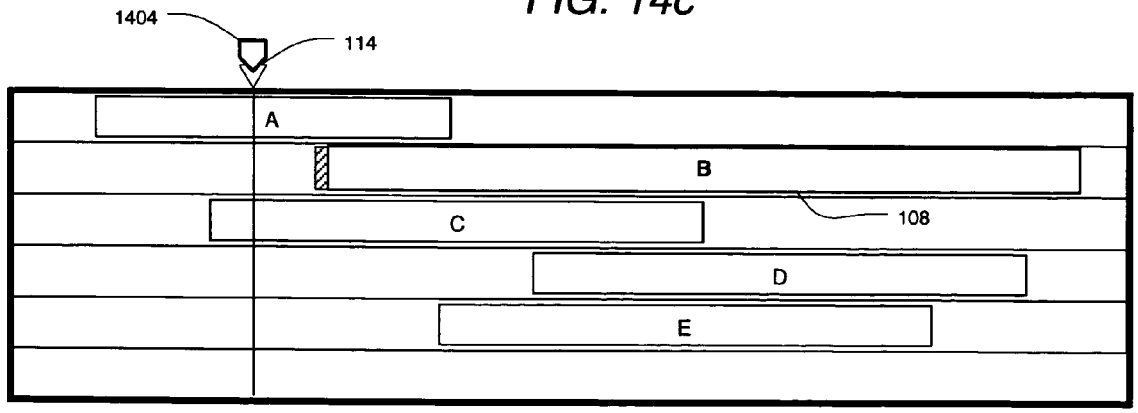

A global marker is a time marker set in the timing panel 106 at the current time marker 114. The user may set any number of time markers in a multimedia presentation. The time markers allow the user jump forward or backward throughout the presentation to these global markers, which can represent any point of interest to the user. FIGS. 14b-d illustrate the associated functionality. In FIG. 14b, there is shown the timing panel 106, with the current time marker 114. In FIG. 14c, the user has entered in the set global marker gesture 1400. In FIG. 14d, the multimedia editing application has responded by placing a global marker 1404 at the current time marker 114.

Figure 14E:
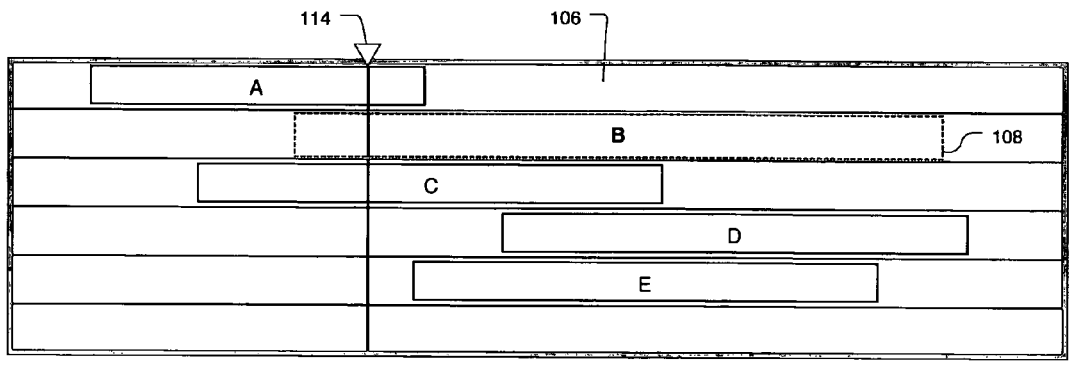
Figure 14F:
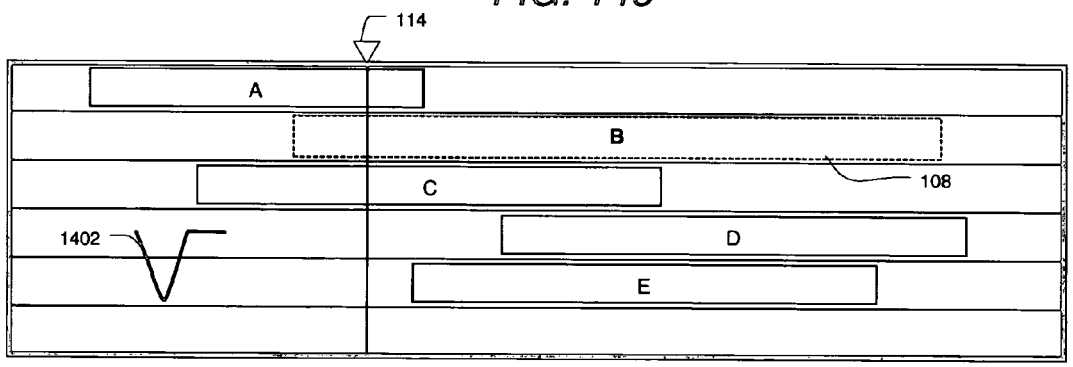
Figure 14G:
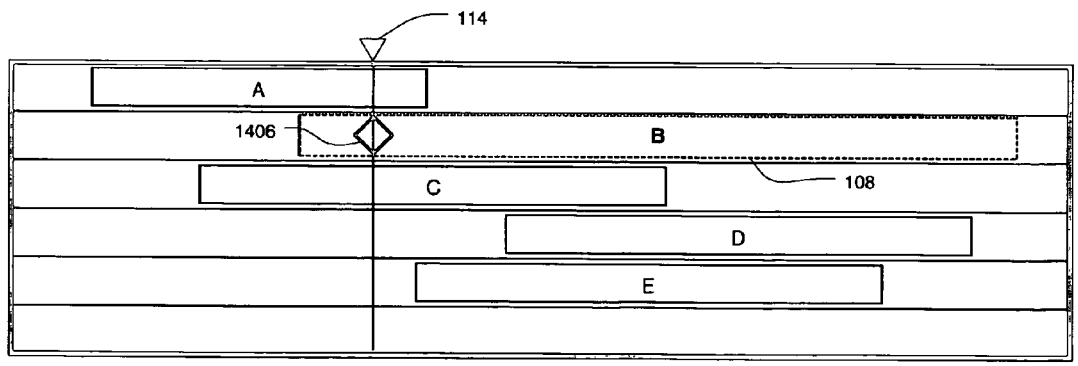

A local time marker is a time marker that is established with the respect to the start time of a particular multimedia object 114, and which stays constant relative to the start time of the object, regardless of where the object 114 is positioned in the multimedia presentation. For example, a local marker may be set at 1 second after the beginning of a user selected object 114. This marker would remain offset 1 second from beginning of the selected object, regardless of where the object begins within the multimedia presentation. FIGS. 14e-g illustrate the associated functionality. In FIG. 14e, the user has selected object bar 108 of object B, as indicated by the dotted outline of this object. Notice that the current time marker 114 is currently within the extent of the this object. In FIG. 14f, the user has input the set local marker gesture 1402. In FIG. 14g, the multimedia editing application has responded by inserting a local time marker 1405 within the object bar 108 for object B at the current time marker 114.

FIGS. 15a-15e illustrates the set play range start gesture 1500 and the set play range end gesture 1502. The geometric form of the set play range start gesture 1500 is a generally rectangular, right facing "C" shape; the geometric form of the set play range end gesture 1502 is a generally rectangular, left facing "C" shape. These forms are visual mnemonics connoting bracketing a portion or region of space or time between respective start and end points. It is instructive to note that while the geometric forms of these gestures have been described with respect to the shape of the letter "C", their mnemonic aspects are entirely unrelated to any word or name of the associated play range functions, such as the symbols "P" or "R". Rather, the mnemonic characteristics, as explained here, clearly derive from the directional and spatial features of the gestures, which merely happen to correspond to the general shapes of the letter "C".

As discussed above, the play range is a section of the current presentation that is used to control the playback behavior, allowing the user to loop over the play range to better focus his editing efforts. The set play range start gesture 1500 sets a play range marker 119 for the start of a play range at the current time marker 114. The set play range end gesture 1502 sets a play range marker 119 for an end of the play range to the current time marker 114. If a play range has already been defined with a start and end point, then these commands update the respective play range markers 119; otherwise they instantiate the markers as needed.

Figure 15A:
FIGS. 15a-e illustrate the set play range start and set play range end gestures and associated functionality.
Figure 15B:
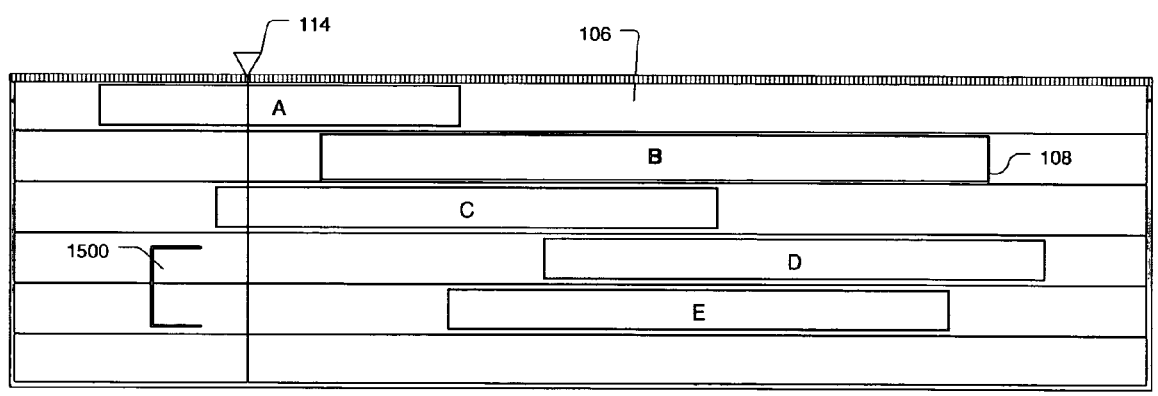
Figure 15C:
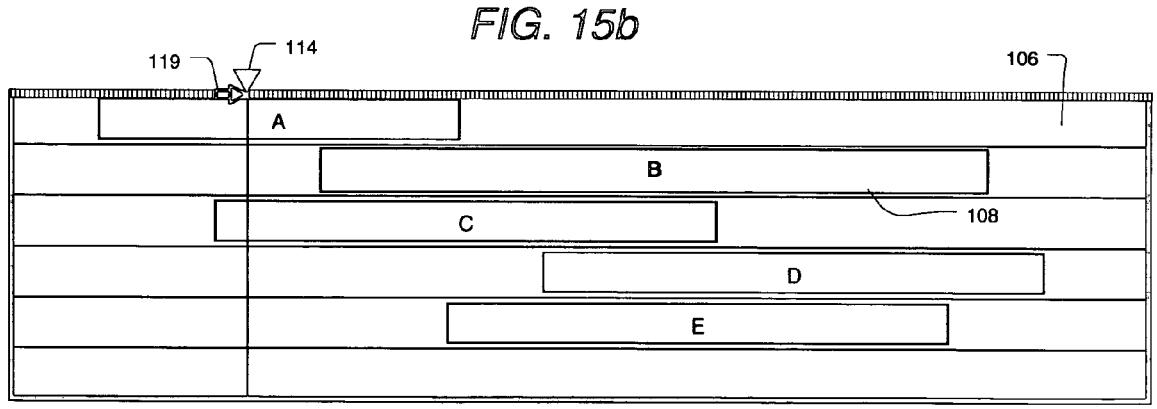
Figure 15D:
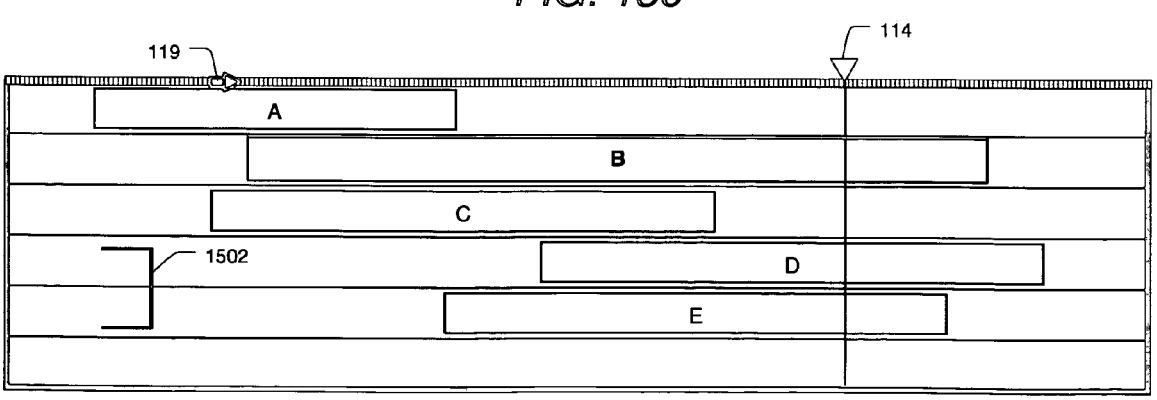
Figure 15E:
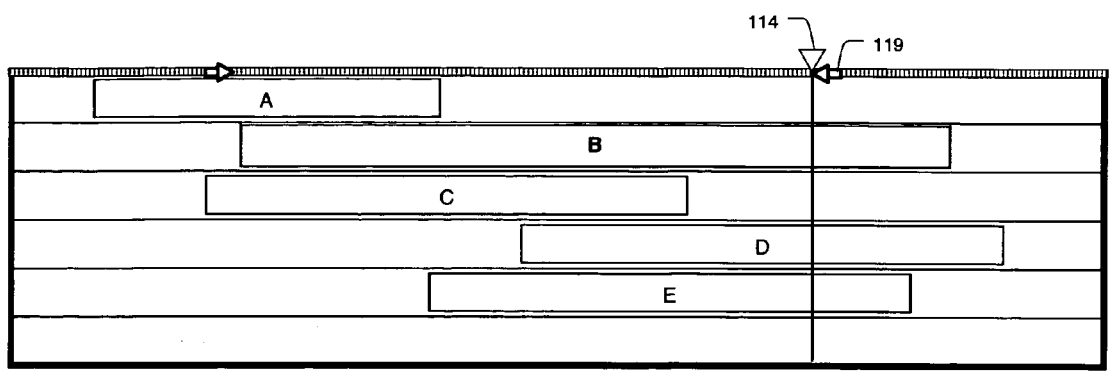

FIG. 15b illustrates the timing panel 106 for which no play range has been established, and at which point the user has input the set play range start gesture 1500. As shown in FIG. 15c, the multimedia editing application processes this gesture and instantiates a play range marker 119 at the current time marker 114. In FIG. 15d, the user has moved the current time marker 114 to a desired end point, and input the set play range end gesture 1502. In FIG. 15e, the multimedia editing application has set a play ranger marker 119 at the new endpoint.

View Management

The next set of gestures comprises gestures associated with functions to control and management the view of the various window and components of the multimedia editing application user interface.

The first pair of these gestures is the zoom in gesture 1600 and the zoom out gesture 1602, illustrated in FIG. 16a. The zoom in gesture 1600 increments the scale (e.g., more pixels per unit size) of the content in the window in which the gesture is input, providing a close up view. The zoom out gesture 1602 decrements the scale (e.g., less pixels per unit size) of the content in the window, providing a reduced view of the content. The geometric forms of these gestures, generally forming a substantially circular shape open along a top portion, connotes the underlying functional operation, here the rotational adjustment of a camera lens to zoom in or out of a field of view. The direction of the strokes indicated positive zoom (clockwise, zoom in), or negative zoom (counter-clockwise, zoom out).

FIGS. 16*b*-16*f* illustrate the associated functions of these gestures. In FIG. 16*b*, there is shown the canvas 102, with a single multimedia object 114, Star B. In FIG. 16*c*, the user has input the zoom in gesture 1600. FIG. 16*d* illustrates that the multimedia editing application has zoomed in on Star B, shown by its magnified size. In FIG. 16*e*, the canvas 102 is a shown at the same scale as FIG. 16*b*, and the user has input the zoom out gesture 1602. FIG. 16*f* illustrates that the multimedia editing application has zoomed out from the canvas 102, showing Star B in reduced size.

Figure 17A:
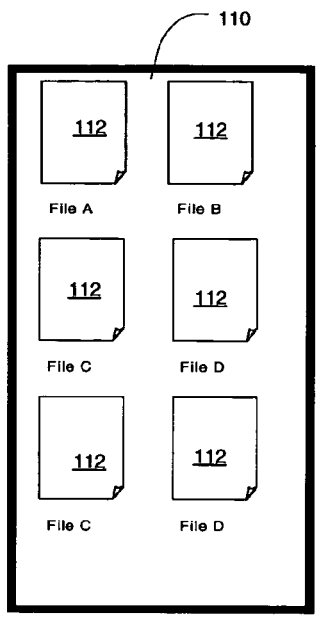
FIGS. 17a-e illustrate the zoom in and zoom out functionality in the context of the file browser.
Figure 17B:
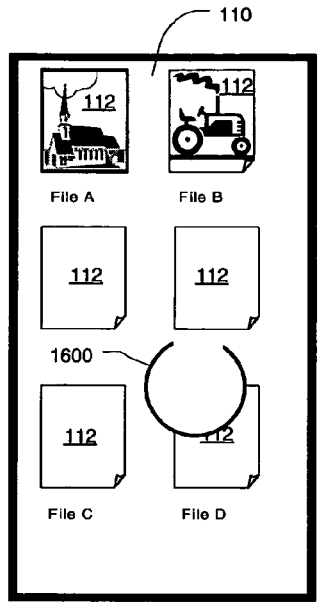
Figure 17C:
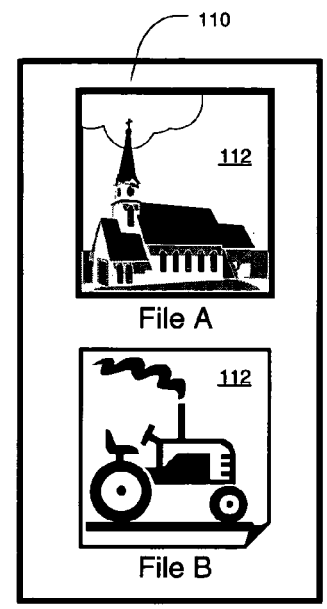

The zoom in gesture 1600 and zoom out gesture 1602 are both context sensitive, and may be used in the file browser 110 and the timing panel 106. FIGS. 17*a*-*e* illustrates the functionality of these gestures in the file browser 110. In FIG. 17*a* shows the file browser 110 with a number of file icons 112. FIG. 17*b* illustrates the file browser 110 wherein the user has input the zoom in gesture 1600. FIG. 17*c* illustrates that the multimedia editing application has zoomed in on the contents of the file browser 110, show the first two file icons 112 for Files A and B in enlarged magnification. This is useful for the user to see more details of the file icon (for example, if the icon illustrates a picture, as in FIGS. 17*b*-*c*).

These gestures may also be used in a preview window (e.g., like preview window 1106) when viewing the content of a selected file 112. The semantics of these gestures are as described for the canvas 102.

Figure 17D:
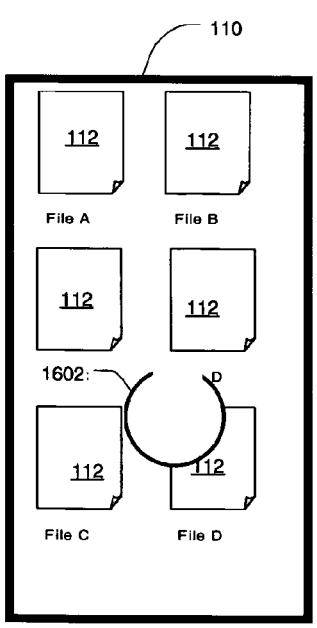
Figure 17E:
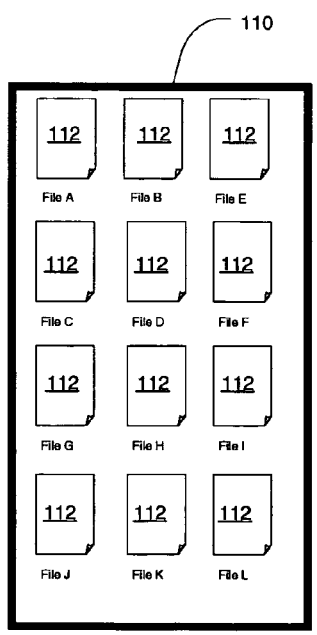

FIG. 17*d* illustrates the file browser 110 again at the same resolution as in FIG. 17*a*, wherein the user has input the zoom out gesture 1602. FIG. 17*e* illustrates that the multimedia editing application has zoomed out from the file browser 110, and now shows the user a larger number of files 112, with smaller sized icons, thus reducing the magnification (or scale) of the icons 112.

Figure 18A:
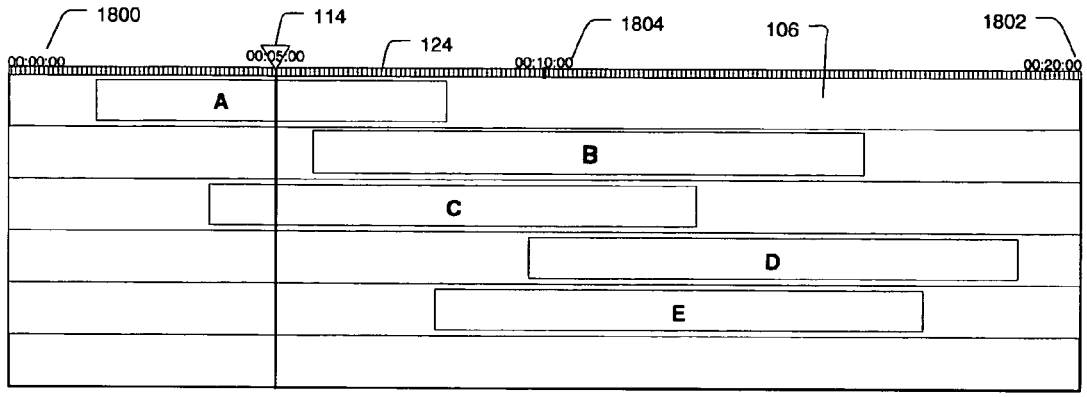
FIGS. 18a-c illustrate the zoom in and zoom out functionality in the context of the timing panel.
Figure 18B:
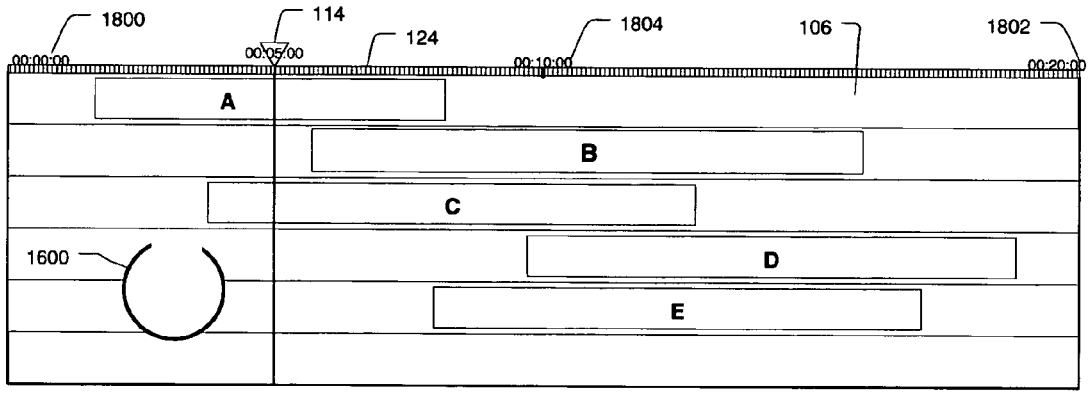
Figure 18C:
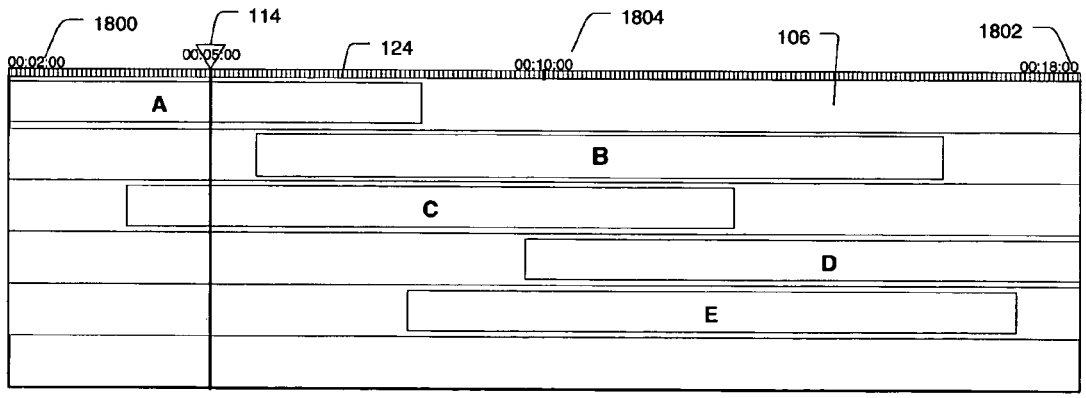

The zoom in gesture 1600 and zoom out gesture 1602 gestures likewise operate in the timing panel 106, to change the resolution of the timescale 124 for the timing panel. FIG. 18*a*-*c* illustrates these functions. In FIG. 18*a* there is shown the timing panel 106 with the timescale 124 having a 20 second range running from a beginning time 1800 at 00:00:00 seconds to and ending time 1802 at 00:20:00 seconds. The halfway point 1806 at 00:10:00 seconds is shown for reference as well. The current time marker 114 is at 00:05:00 seconds. In FIG. 18*b* the user has input the zoom in gesture 1600 into the timing panel 106. In FIG. 18*c*, the multimedia editing application has executed the zoom in function in response to the gesture, and has increased the resolution of the timescale 124, which is adjusted to show a 16 second range from the beginning time 1800 of 00:02:00 to the ending time 1802 of 00:18:00, still centered at 00:18:00 seconds. This is essentially a 20% increase in the resolution of the time scale. All of the object bars 108 in the timing panel 106 are resized to have their duration and In and Out points adjusted accordingly. The functionality of the zoom out gesture 1602 would accordingly decrease the resolution of the timescale, for example showing a time extent from 00:00:00 to 00:24:00 (a 20% decrease).

The zoom step (percent increase or decrease) for the zoom in gesture 1600 or zoom out gesture 1602 can be either fixed or set by the user, as desired. In one embodiment, the step size is +/−20%.

Figure 19A:
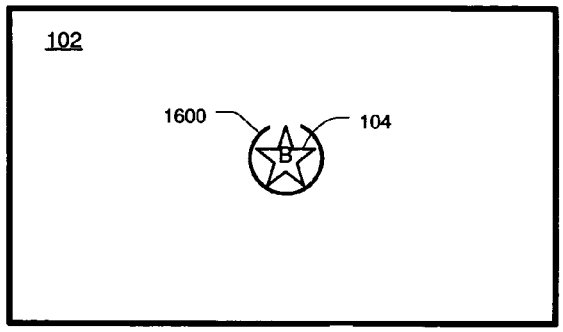
FIGS. 19a-b illustrate the zoom in and zoom out functionality in conjunction with various modifiers.
Figure 19B:
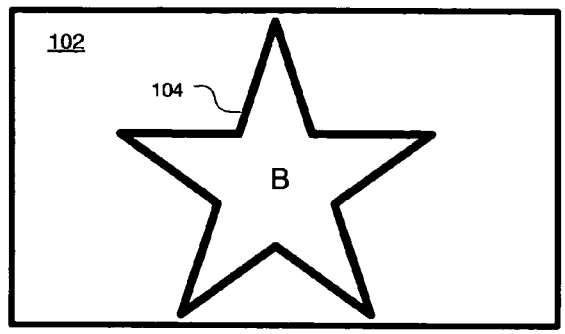

Various modifiers may also be used with the zoom in gesture 1600 and zoom out gesture 1602. The SHIFT key used with the zoom in gesture 1600 fits contents (e.g., objects 114, files 112, object bars 108) that are within the perimeter of the gesture stroke to the size of the current window pane. FIG. 19*a*-*b* illustrate. In FIG. 19*a*, there is shown Star B in the canvas 102, and the user has input the zoom in gesture 1600 by drawing the gesture around Star B. FIG. 19*b* shows that the multimedia editing application in response, zooms in on that object and resizes the object so that the Star B object fills the window. Used in conjunction with the zoom out gesture 1602, the SHIFT key causes the contents of the current window pane to be rescaled so that they fit within the perimeter of the gesture stroke.

The ALT key also modifies these gestures, by centering the rescaled window at the center of the gesture. As part of the gesture recognition, the multimedia editing application will compute the center (or centroid) of a gesture, and use that center location to be the center of the rescaled window pane.

Figure 20:
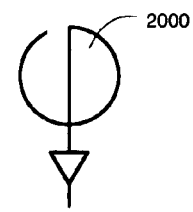
FIG. 20 illustrates the interactive zoom gesture.

A related view management gesture is the interactive zoom gesture 2000, illustrated in FIG. 20. This gesture places the multimedia editing application in an interactive zoom mode, whereby the user can dynamically and continuously zoom in and out. In this mode, the user can input a first gesture to variably zoom in, and second gesture to variably zoom out. The particular gestures that control the zoom function can vary. In one embodiment, to control the zoom factor, the user drags the input device to the left or right, and the zoom factor is a logarithmic function of the acceleration of the input device, with a left drag being zoom out, and right drag being zoom in. This mapping of gesture direction to zoom factor provides a visual mnemonic since leftward motion relative to a number line is towards decreasing values (thus decreasing resolution), while rightward relative to a number line is towards increasing values (thus increasing the resolution). As another embodiment, the user can input a generally clockwise circular gesture, similar to zoom in gesture 1600 but continuing in the circular shape. In response the multimedia editing application continually zooms the current window pane at a constant rate, for example 1% zoom for each 6° of arc. Likewise, the user can input a counterclockwise circular gesture, like zoom out gesture 1602, but continuing in circular shape, to continuously zoom out. Other gesture pairs can be used in this mode as well for the continuous zoom.

The interactive zoom gesture 2000 is also context sensitive, and operates in the timing panel 106 and file browser 110 in with the same semantics as described for the zoom in gesture 1600 and zoom out gesture 1602.

Figure 21:
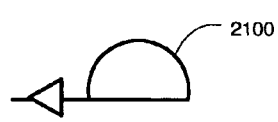
FIG. 21 illustrates the pan gesture.

The next view navigation gesture is the pan gesture 2100, as illustrated in FIG. 21. The geometric form of this gesture, a upper semicircle with an ending stroke drawn across the diameter of the semicircle, and the extending in length beyond the perimeter of the semicircle, connotes a "mitt," used to hold and move an object. This gesture places the current window pane in a pan (or scroll) mode, allow the user to interactively pan the content of the window pan by holding down a selection button on the input device, and dragging the current window in any desired direction. The multimedia editing application can change the cursor to reflect the pan mode, for example using a "hand" cursor.

The pan gesture 2100 is also context sensitive, and may be used in the tinting panel 106, the file browser 110, and a preview window. In the timing panel 106 and file browser 110, the pan mode gesture acts as a horizontal and vertical scroll, automatically scrolling these windows in response to the direction of panning.

Figure 22A:
FIGS. 22a-c illustrate the home view gesture and associated functionality.
Figure 22B:
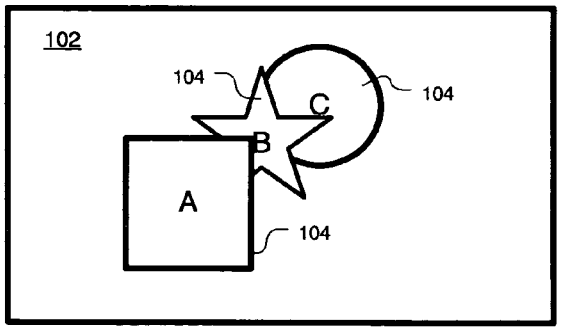
Figure 22C:
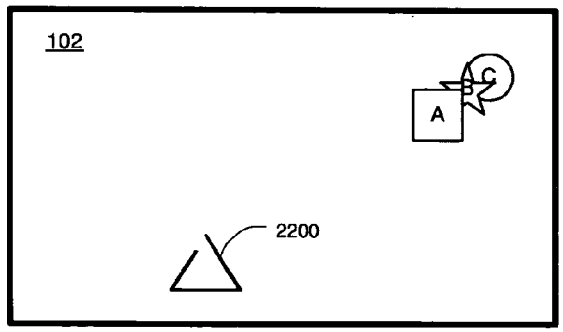

A further view navigation gesture is the home view gesture 2200, as illustrated in FIG. 22*a*. The geometric form of this gesture is a substantially triangular stroke, connoting a "base" or "foundation" position. Generally, the home view gesture 2200 resets the view of the window in which the gesture is received to a native view, which includes rescaling the resolution of the window to a native resolution (typically 100%), and resetting the offset of the window to a native offset position (e.g., a center of the window; a first element of a list; a top, left corner; a beginning time point; or other user designated native offset). In this regards, the home view gesture 2200 is another context sensitive gesture. When input into the canvas 102, the multimedia editing application responds by resetting the canvas view to its native resolution (e.g., 100% resolution) and resetting to a native view by centering the view at the (X,Y) center of the window. FIGS. 22*b-c* illustrate this functionality. In FIG. 22*b*, there is shown the canvas 102 at 100% scale, and centered. In FIG. 22*c*, there is shown the canvas 102 in a reduced scale from being zoomed out, and then off-centered both horizontally and vertically. The user has input the home view gesture 2200 as illustrated. The multimedia editing application responds by rescaling and centering the canvas 102 so that it returns to its appearance as in FIG. 22*b*.

In the file browser 110, the home view gesture 2200 likewise returns the file browser 110 window pane to a native resolution, here too 100% scale, and then resetting to a native offset for the window, at the top of the item list. In the timing panel 106, the home view gesture 2200 resets the timescale 124 to a native resolution which is here the entire project duration, running from a start time of 00:00:00 to the project end time, whatever value that may be. The current time marker 114 and play ranger markers 119 are not changed, though their relative location on the screen will be adjusted, as will the placement and size of all objects bars in the timing panel 106.

Figure 23A:
FIGS. 23a-c illustrate the fit to window gesture and associated functionality.
Figure 23B:
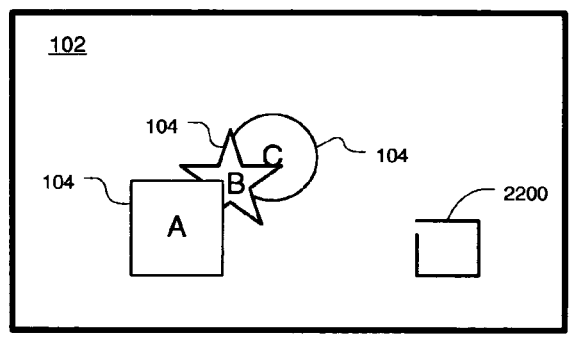
Figure 23C:
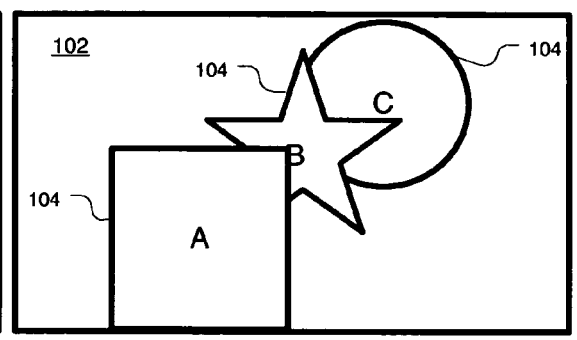

The next view management gesture is the fit to window gesture 2300, as illustrated in FIG. 23*a*. The geometric form of this gesture, a generally square stroke, is a visual mnemonic for the shape of a window, which is the object on which the associated function operates. This gesture causes the multimedia editing application to rescale the current window to fit all of the contents of the window to just fit inside of the window. This enables the user to see all of the content for the window at the largest scale that still allows all of the content to fit. FIG. 23*b* illustrates the canvas 102, with the various objects 104 shown at a reduced resolution, say 80% of scale. The user has input the fit to window gesture 2300 in this window. FIG. 23*c* illustrates the multimedia editing application has rescaled the canvas 102 so that these objects now are as large as possible to fit the available size of the canvas 102 window. In some cases, this rescaling may scale the current window beyond 100%, if the horizontal and vertical extent between the outer edges of the objects is less then the width and height of the current window size; in other cases the rescaling will be less than 100% where the horizontal or vertical extent exceeds the respective width or height of the window.

The next view management gestures are for opening and closing various ones of the window panes of the user interface. FIG. 24*a* illustrates the open/close bottom panel gesture 2400 and open/close top panel gesture 2402. FIG. 25*a* illustrates the open/close bottom left panel gesture 2500 and the open/close right panel gesture 2502. Each of these gestures is a visual mnemonic of the motion of a hand moving to open or close a window panel. The forms of these gestures can be described, for purposes of explanation only, as "N" or "Z" shaped.

The semantics of these gestures as is follows. First, each gesture is associated with a state changing function, in that a single gesture is used to open a closed panel, or closed an open panel, thus changing the state of a particular panel. The panel which is the object of the gesture's function is indicated by the direction from which the gesture begins. Thus, the open/close bottom panel gesture 2400 begins at point towards the bottom of the user interface window with an upward stroke (e.g., the left leg of the "N"), and thus indicates that a panel situated along the bottom of the window is the object of the gesture. The open/close top panel gesture 2402 begins at a point towards the top of the user interface window with a downward stroke (e.g., the right leg of the "N"), and thus indicates that a panel oriented along the top of the user interface window is the object of the gesture. The open/close left panel gesture 2500 begins at point towards the left side of the user interface window with an rightward stroke (e.g., the top leg of the "Z"), and thus indicates that a panel situated along the left of the user interface window is the object of the gesture. The open/close right panel gesture 2502 begins at a point towards the right side of the user interface with a leftward stroke (e.g., the bottom leg of the "Z"), and thus indicates that a panel oriented along the top of the user interface 100 is the object of the gesture. It is instructive to note that while the geometric forms of the open/close panel gestures have been described with respect to the shapes of the letters "Z" and "N", the mnemonic aspects are entirely unrelated to any word or name of the associated open and close functions, such as the symbols "O" or "C". Rather, the mnemonic characteristics, as explained here, clearly derive from the directional and spatial features of the gestures, which merely happen to correspond to the general shapes of these letters.

FIG. 24*b* illustrates the user interface with just the canvas 102 and the file browser 110 panels open. Notice that the timing panel 106, which would be the bottom panel, is not currently open. The user has input the open/close bottom panel gesture 2400 into the canvas 102. In response, the multimedia editing application opens and displays the designated bottom panel, here the timing panel 106, as illustrated in FIG. 24*c*. At this point, if the user inputs the open/close bottom panel gesture 2400 again, the multimedia editing application will close this panel 106, restoring the user interface to that of FIG. 24*b*.

Figure 24D:
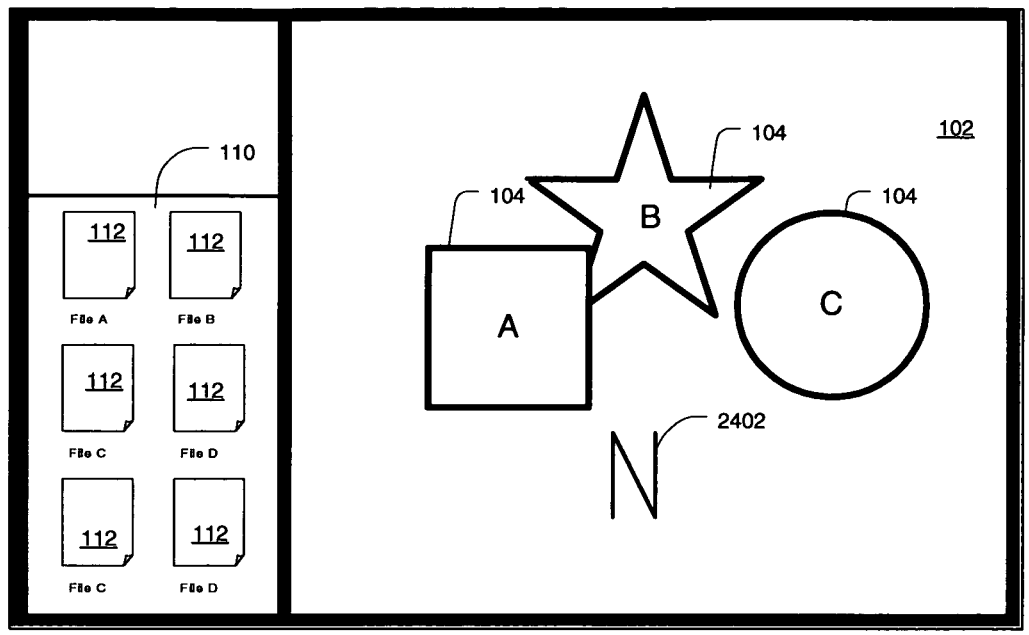
Figure 24E:
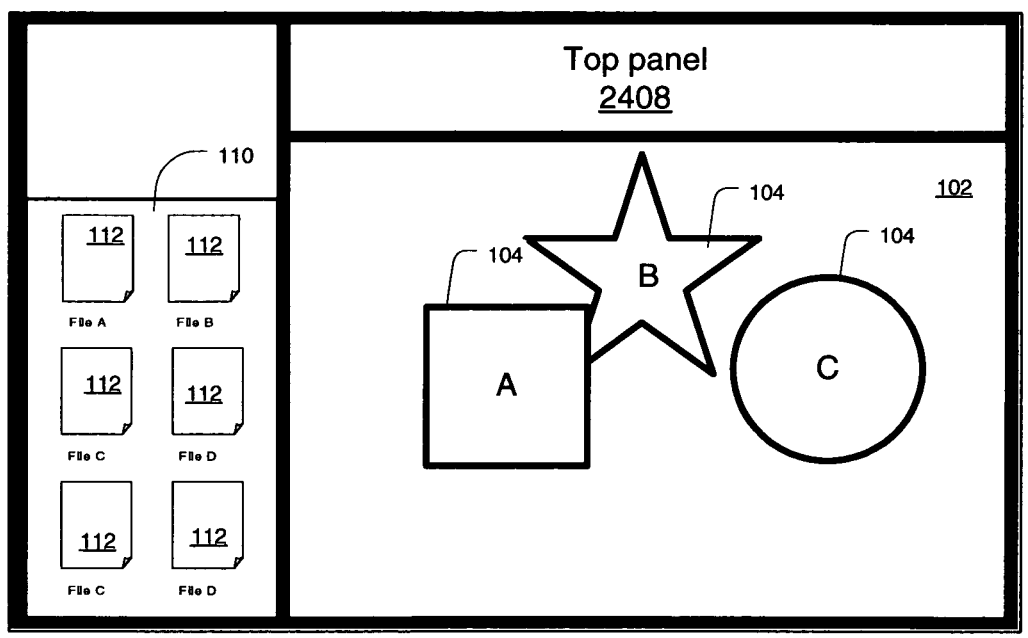

FIG. 24*d* illustrates again the user interface 100 with just canvas 102 and file browser 110 panels open. The user has input the open/close top panel gesture 2402 into the canvas 102. In response, the multimedia editing application opens and displays a designated top panel 2408, as illustrated in FIG. 24*e*. This top panel 2408 can contain any window designated by the user. At this point, if the user inputs the open/close top panel gesture 2402 again, the multimedia editing application will close this panel 2408, restoring the user interface to that of FIG. 24*d*.

Figure 25B:
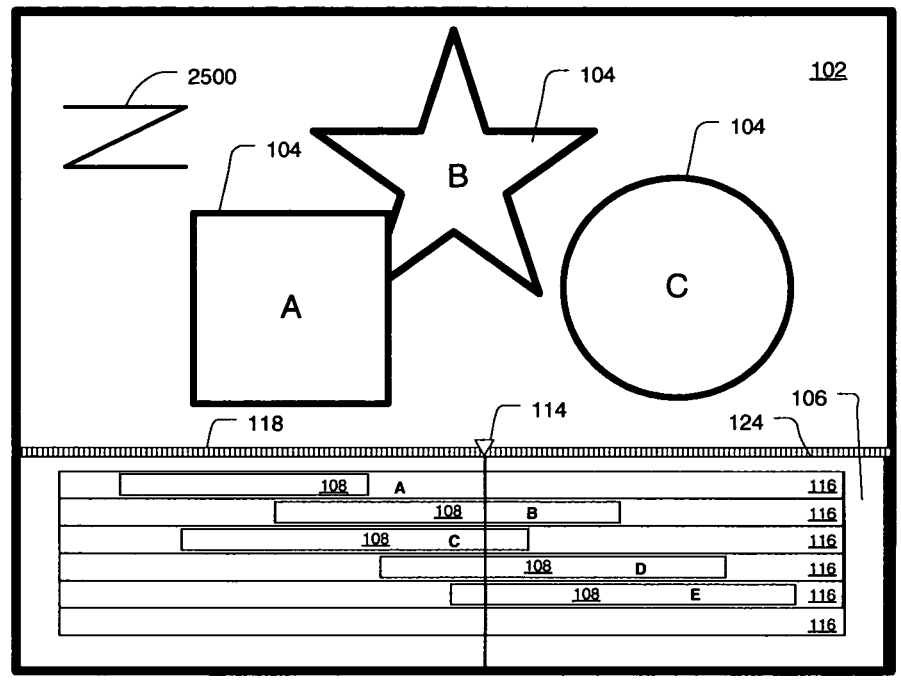
Figure 25C:
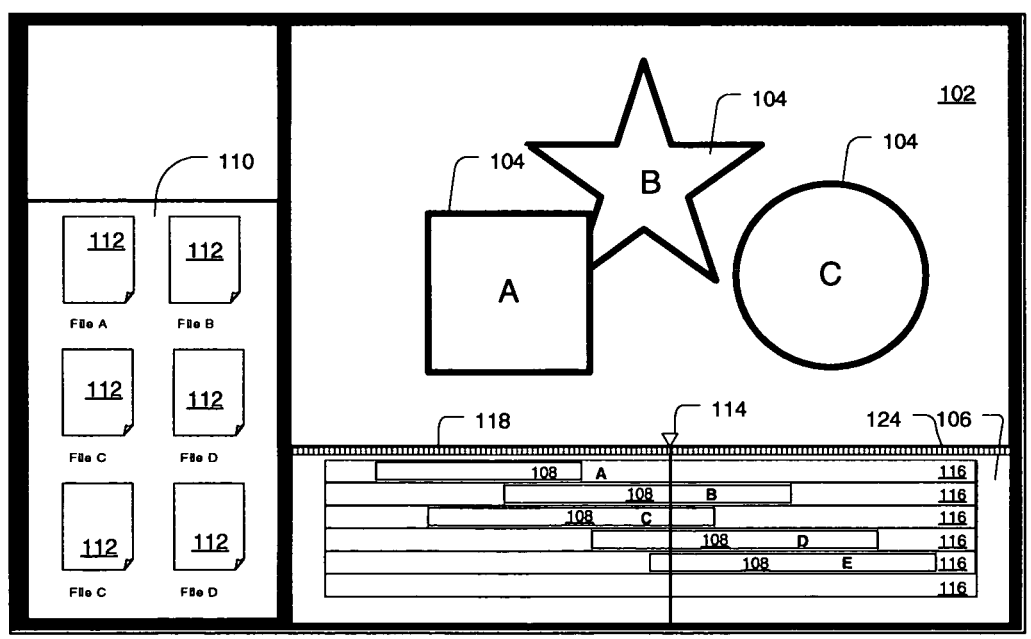

FIGS. 25*b-c* illustrate the functionality of the open/close left panel gesture 2500. In FIG. 25*b* there is illustrated user interface 100 with just the canvas 102 and timing panel 106 open. The user has input the open/close left panel gesture 2500 into the canvas 102. In response, the multimedia editing application opens and displays a designated left panel, here the file browser 110, as illustrated in FIG. 25*c*. This left panel can contain any window designated by the user. At this point, if the user inputs the open/close left panel gesture 2400 again, the multimedia editing application will close the file browser 110, restoring the user interface to that of FIG. 25b. The open/close right panel gesture 2502 operates in a complementary fashion on a designated panel on the right side of the user interface 100.

The association of which panel is operated on by one of these gestures 2400, 2402, 2500, 2502 may be predetermined by the multimedia editing application, may be designated by the user, or may be dynamically determined based on the present configuration of window panels as placed by the user.

General

Figure 26:
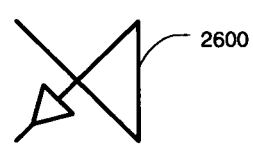
FIG. 26 illustrates the delete gesture.

The following gestures are associated with general functionality of the multimedia editing application. FIG. 26 illustrates the delete gesture 2600. This gesture is used to delete a selected object or, item (e.g., a file 112) in any of the windows. The geometric form of this gesture is a diagonal cross (substantially "X" shaped, preferably with connected diagonal strokes), thereby connoting the action of "crossing out" the object. As noted above, with respect to the open/close panel gestures, the visual mnemonic aspects of the delete gesture does not derive from the correspondence of the shape "X" referring to a function name, but rather to the directional and spatial actions one would taken when crossing out an error or other undesired object.

Figure 27:
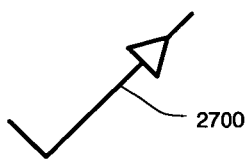
FIG. 27 illustrates the select mode gesture.

FIG. 27 illustrates the select mode gesture 2700. This gesture causes the multimedia editing application to change from whatever is the current mode of operation (e.g., pan mode, interactive zoom mode, etc.) to the select mode in which the user can select objects, menu items, controls, toolbars and the like, for editing and direct manipulation. The geometric form of the select gesture 2700 is a substantially similar to a check mark. This form thereby connotes the action of "selecting" since in the select mode, the user is able to directly select and manipulate objects, control, menu items, icons, toolbars, and so forth.

Figure 28:
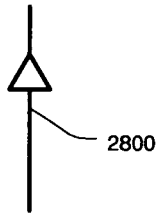
FIG. 28 illustrates the show/hide confirmation display gesture.

FIG. 28 illustrates the show/hide "heads up" display gesture 2800. This gesture turns on and off a display area used to display confirmation message that a particular gesture has been successfully input. The "heads up" aspect of this gesture is further described below.

Figure 29:
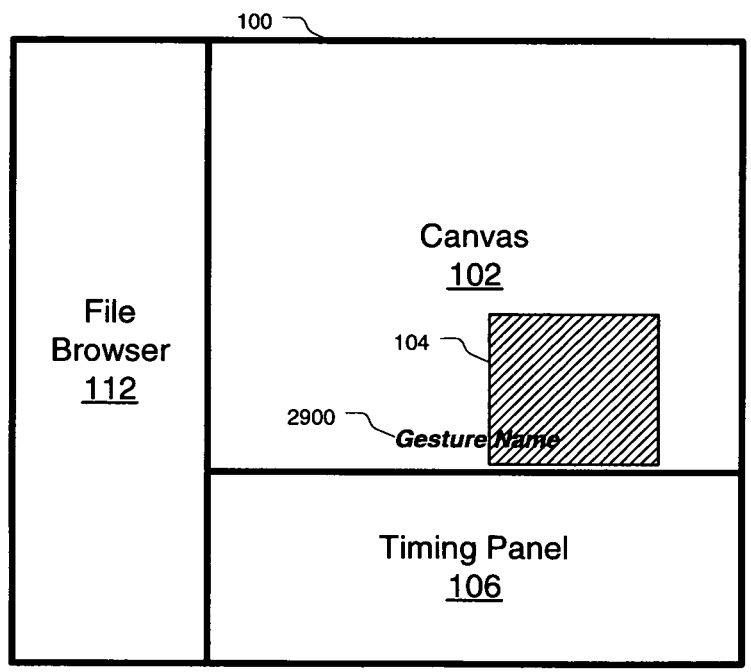
FIG. 29 illustrates the user interface of the multimedia editing application including the gesture confirmation display.

FIG. 29 again illustrates the basic form of the user interface 100, including the canvas 102, timing panel 106, and file browser 110. When the user inputs any gesture in any of the window panels, the multimedia editing application can be configured to display the name of the gesture in a confirmation message 2900 such as the gesture name, or other visually indicative confirmation information, such as green light, an "OK" symbol, or the like. This provides a secondary visual feedback to the user that the gesture has been successfully received and executed. This feature is desirable because in some cases the user may incorrectly draw a gesture, and the multimedia editing application will thus interpret the gesture differently from that which the user intended. The confirmation message can contain any usefully descriptive information of the gesture, and is not limited to either the names described here, or the specific names used in an particular embodiment. The confirmation message may likewise be located in a variety of different positions, such as the various corners of the canvas 102, and may be positioned by the user as desired. In one embodiment, the confirmation message 2900 is displayed only temporarily, for between about 1 and 3 seconds.

Preferably, the confirmation message 2900 is displayed with no fill around the text, and the text for the gesture name in a contrasting color (or pattern) to the background color of the canvas 102 or any objects 104 behind, so as to be more easily noticed by the user. This provides a "heads up" type presentation to the user, as the user can "see through" the message 2900 to the canvas 102 and objects behind it. Accordingly, the geometric form of this gesture is a visual mnemonic for the action of looking up, since the gesture has the form of a single, upward vertical stroke, in essence suggesting to the user to look up or direct their eyes upward. For example, if the canvas behind the confirmation message 2900 is black, then the confirmation message 2900 may be displayed with white text for the gesture name; if the canvas 102 behind the confirmation message 2900 is white, then the gesture name text may be displayed in black. Other variations in the formatting of the message will be apparent to those of skill in the art. This feature can be enabled or disabled in the multimedia editing application by the user, as desired by use of this gesture.

As noted above, the various gestures of the present invention have shapes and characteristics that form visual mnemonics of their associated functions, without themselves being letters, numbers or other linguistic symbols. That said, it should be noted that the gestures of the present invention can be used in a multimedia editing application (or similar application) in which linguistic based gestures as also present, and hence the present invention does not require the exclusive use of the gestures disclosed and described herein.

The underlying gesture recognition mechanism may be any known or subsequently developed gesture recognition algorithm and accompany system elements. The art of gesture recognition is well developed, and thus it is not necessary to describe in detail here how a gesture recognition system operates. In general, the gesture recognition engine maintains a gesture definition (or prototype) that describes the characteristics of each gesture. The gesture definition may be procedural, vector-oriented, statistical, curve-based, pixel mapped, or any other implementation. These prototypes form a gesture library of defined gesture attributes or characteristics, which will be stored in computer accessible memory (e.g., disk or RAM). The gesture recognition engine further maintains a mapping between each gesture and a predetermined function provided by the multimedia editing application. These functions are of course internally exposed in the multimedia editing application via function interfaces. When the multimedia editing application receives a gesture mode trigger event, indicating that the user is about to enter a gesture, it receives the input stroke data from the user interface handler of the operating system, and passes the stroke information to the gesture recognition engine. The gesture recognition engine analyses the stroke data with respect to the known gesture prototypes, and determines which gesture was input. Based on the determined gesture, the gesture recognition engine then invokes the associated function of the multimedia editing application. The gesture recognition engine may be implemented, for example, using any of the systems and methods described in the following patents and applications, all of which incorporated by reference herein: U.S. Pat. Nos. 5,859,925; 5,768,422; 5,805,730; 5,805,731 5,555,363; 5,563,996; 5,581,681; 5,583,542; 5,583,946; 5,590,219; 5,594,640; 5,594,810; 5,612,719; 5,677,710; 5,398,310; 5,523,775; 5,528,743, and U.S. application Ser. No. 09/520,206 (filed Mar. 7, 2000). In addition, an embodiment may also be implemented using Microsoft Corp.'s Tablet PC Software Development Kit (SDK), Version 1.5, which includes a Gesture Recognizer that can be configured to recognize custom gestures for an application, and which is incorporated by reference herein.

The present invention has been described in particular detail with respect to one possible embodiment. Those of skill in the art will appreciate that the invention may be practiced in other embodiments. First, the particular naming of the gestures, capitalization of terms, the attributes, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various user interface components and gestures described herein is merely exemplary, and not mandatory. Those of skill in the art recognize that the present invention is implemented using a computer program(s) executing on a computer system including a processor, memory, storage devices, input devices (e.g., keyboard, mouse, pen, tablet, etc.) and output devices (e.g., display, audio, etc.), peripherals, and network connectivity interfaces. The memory, or alternatively one or more storage devices in the memory, includes a non-transitory computer readable storage medium. The details of these aspects of the system well known to those of skill in the art, and are thus not illustrated or further described here.

The displays presented herein are not inherently related to any particular computer or other apparatus. Various general-purpose systems may also be used with programs in accordance with the teachings herein, or it may prove convenient to construct more specialized apparatus to perform the described functions.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A method, comprising:
   at an electronic device with a display:
   displaying a user interface associated with an application on the display;
   detecting a first finger contact on the user interface;
   detecting a modifier input that is distinct from the first finger contact,
   while detecting the modifier input, detecting movement of the first finger contact; and,
   in response to detecting movement of the first finger contact:
   zooming in on the user interface when the movement corresponds to a single circular clockwise stroke, wherein zooming in comprises resizing objects within a perimeter of the single circular clockwise stroke to fill the user interface; and
   zooming out of the user interface when the movement corresponds to a circular counter-clockwise stroke.

2. A method, comprising:
   at an electronic device with a display:
   displaying a user interface associated with an application on the display;
   detecting a first finger contact on the user interface;
   detecting a modifier input that is distinct from the first finger contact,
   while detecting the modifier input, detecting movement of the first finger contact; and,
   in response to detecting movement of the first finger contact:
   zooming in on the user interface when the movement corresponds to a circular clockwise stroke; and
   zooming out of the user interface when the movement corresponds to a single circular counter-clockwise stroke, wherein zooming out comprises resizing objects within the user interface to fit within a perimeter of the single circular counter-clockwise stroke.

3. A method, comprising:
   at an electronic device with a display:
   displaying a user interface associated with an application on the display;
   detecting a first finger contact on the user interface;
   detecting a modifier input that is distinct from the first finger contact,
   while detecting the modifier input, detecting movement of the first finger contact; and,
   in response to detecting movement of the first finger contact:
   zooming in on the user interface when the movement corresponds to a single circular clockwise stroke, wherein zooming in comprises centering the user interface at a center of the single circular clockwise stroke; and
   zooming out of the user interface when the movement corresponds to a circular counter-clockwise stroke.

4. A method, comprising:
   at an electronic device with a display:
   displaying a user interface associated with an application on the display;
   detecting a first finger contact on the user interface;
   detecting a modifier input that is distinct from the first finger contact,
   while detecting the modifier input, detecting movement of the first finger contact; and,
   in response to detecting movement of the first finger contact:
   zooming in on the user interface when the movement corresponds to a circular clockwise stroke; and
   zooming out of the user interface when the movement corresponds to a single circular counter-clockwise stroke, wherein zooming out comprises centering the user interface at a center of the single circular counter-clockwise stroke.

5. An electronic device, comprising:
   a display;
   one or more processors;
   memory; and
   one or more programs, wherein the one or more programs are stored in the memory and configured to be executed by the one or more processors, the programs including instructions for:
   displaying a user interface associated with an application on the display;
   detecting a first finger contact on the user interface;
   detecting a modifier input that is distinct from the first finger contact,
   while detecting the modifier input, detecting movement of the first finger contact; and,
   in response to detecting movement of the first finger contact:
   zooming in on the user interface when the movement corresponds to a single circular clockwise stroke, wherein zooming in comprises resizing objects within a perimeter of the single circular clockwise stroke to fill the user interface; and
   zooming out of the user interface when the movement corresponds to a circular counter-clockwise stroke.

6. An electronic device, comprising:
   a display;
   one or more processors;

memory; and
one or more programs, wherein the one or more programs are stored in the memory and configured to be executed by the one or more processors, the programs including instructions for:
displaying a user interface associated with an application on the display;
detecting a first finger contact on the user interface;
detecting a modifier input that is distinct from the first finger contact,
while detecting the modifier input, detecting movement of the first finger contact; and,
in response to detecting movement of the first finger contact:
zooming in on the user interface when the movement corresponds to a circular clockwise stroke; and
zooming out of the user interface when the movement corresponds to a single circular counter-clockwise stroke, wherein zooming out comprises resizing objects within the user interface to fit within a perimeter of the single circular counter-clockwise stroke.

7. An electronic device, comprising:
a display;
one or more processors;
memory; and
one or more programs, wherein the one or more programs are stored in the memory and configured to be executed by the one or more processors, the programs including instructions for:
displaying a user interface associated with an application on the display;
detecting a first finger contact on the user interface;
detecting a modifier input that is distinct from the first finger contact,
while detecting the modifier input, detecting movement of the first finger contact; and,
in response to detecting movement of the first finger contact:
zooming in on the user interface when the movement corresponds to a single circular clockwise stroke, wherein zooming in comprises centering the user interface at a center of the single circular clockwise stroke; and
zooming out of the user interface when the movement corresponds to a circular counter-clockwise stroke.

8. An electronic device, comprising:
a display;
one or more processors;
memory; and
one or more programs, wherein the one or more programs are stored in the memory and configured to be executed by the one or more processors, the programs including instructions for:
displaying a user interface associated with an application on the display;
detecting a first finger contact on the user interface;
detecting a modifier input that is distinct from the first finger contact,
while detecting the modifier input, detecting movement of the first finger contact; and,
in response to detecting movement of the first finger contact:
zooming in on the user interface when the movement corresponds to a circular clockwise stroke; and
zooming out of the user interface when the movement corresponds to a single circular counter-clockwise stroke, wherein zooming out comprises centering the user interface at a center of the single circular counter-clockwise stroke.

9. A non-transitory computer accessible memory storing one or more programs, the one or more programs comprising instructions, which when executed by an electronic device with a display, cause the electronic device to:
display a user interface associated with an application on the display;
detect a first finger contact on the user interface;
detect a modifier input that is distinct from the first finger contact,
while detecting the modifier input, detect movement of the first finger contact; and,
in response to detecting movement of the first finger contact:
zoom in on the user interface when the movement corresponds to a single circular clockwise stroke, wherein zooming in comprises resizing objects within a perimeter of the single circular clockwise stroke to fill the user interface; and
zoom out of the user interface when the movement corresponds to a circular counter-clockwise stroke.

10. A non-transitory computer accessible memory storing one or more programs, the one or more programs comprising instructions, which when executed by an electronic device with a display, cause the electronic device to:
display a user interface associated with an application on the display;
detect a first finger contact on the user interface;
detect a modifier input that is distinct from the first finger contact,
while detecting the modifier input, detect movement of the first finger contact; and,
in response to detecting movement of the first finger contact:
zoom in on the user interface when the movement corresponds to a circular clockwise stroke; and
zoom out of the user interface when the movement corresponds to a single circular counter-clockwise stroke, wherein zooming out comprises resizing objects within the user interface to fit within a perimeter of the single circular counter-clockwise stroke.

11. A non-transitory computer accessible memory storing one or more programs, the one or more programs comprising instructions, which when executed by an electronic device with a display, cause the electronic device to:
display a user interface associated with an application on the display;
detect a first finger contact on the user interface;
detect a modifier input that is distinct from the first finger contact,
while detecting the modifier input, detect movement of the first finger contact; and,
in response to detecting movement of the first finger contact:
zoom in on the user interface when the movement corresponds to a single circular clockwise stroke, wherein zooming in comprises centering the user interface at a center of the single circular clockwise stroke; and
zoom out of the user interface when the movement corresponds to a circular counter-clockwise stroke.

12. A non-transitory computer accessible memory storing one or more programs, the one or more programs comprising instructions, which when executed by an electronic device with a display, cause the electronic device to:

display a user interface associated with an application on the display;
detect a first finger contact on the user interface;
detect a modifier input that is distinct from the first finger contact,
while detecting the modifier input, detect movement of the first finger contact; and,
in response to detecting movement of the first finger contact:
  zoom in on the user interface when the movement corresponds to a circular clockwise stroke; and
zoom out of the user interface when the movement corresponds to a single circular counter-clockwise stroke, wherein zooming out comprises centering the user interface at a center of the single circular counter-clockwise stroke.

* * * * *

UNITED STATES PATENT AND TRADEMARK OFFICE
CERTIFICATE OF CORRECTION

PATENT NO. : 8,448,083 B1
APPLICATION NO. : 10/826878
DATED : May 21, 2013
INVENTOR(S) : Migos et al.

Page 1 of 1

It is certified that error appears in the above-identified patent and that said Letters Patent is hereby corrected as shown below:

On the Title Page, item (75), please delete "Mouileseaux" and add -- Mouilleseaux --.

Signed and Sealed this
Twenty-seventh Day of August, 2013

Teresa Stanek Rea
*Acting Director of the United States Patent and Trademark Office*